(12) United States Patent
Matono

(10) Patent No.: US 8,400,732 B2
(45) Date of Patent: Mar. 19, 2013

(54) PERPENDICULAR MAGNETIC WRITE HEAD, HAVING SIDE SHIELDS COUPLED TO A LEADING SHIELD AND APART FROM A TRAILING SHIELD

(75) Inventor: Naoto Matono, Saku (JP)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1018 days.

(21) Appl. No.: 11/979,822

(22) Filed: Nov. 8, 2007

(65) Prior Publication Data

US 2008/0112081 A1    May 15, 2008

(30) Foreign Application Priority Data

Nov. 10, 2006    (JP) ................... 2006-305498

(51) Int. Cl.
*G11B 5/127* (2006.01)
*G11B 5/147* (2006.01)

(52) U.S. Cl. .................................. 360/125.12

(58) Field of Classification Search ............. 360/125.09, 360/125.1, 125.11, 125.12, 125.13, 125.14, 360/125.15

See application file for complete search history.

(56) References Cited

U.S. PATENT DOCUMENTS

| | | | |
|---|---|---|---|
| 4,656,546 A | 4/1987 | Mallory | |
| 6,759,081 B2 | 7/2004 | Huganen et al. | |
| 6,954,340 B2 | 10/2005 | Shukh et al. | |
| 7,042,682 B2 * | 5/2006 | Hu et al. | 360/317 |
| 2006/0198049 A1 * | 9/2006 | Sasaki et al. | 360/126 |
| 2008/0068747 A1 * | 3/2008 | Sasaki et al. | 360/110 |

FOREIGN PATENT DOCUMENTS

| | | |
|---|---|---|
| EP | 0 360 978 A2 | 4/1990 |
| JP | A 02-066710 | 3/1990 |
| JP | A 2001-250204 | 9/2001 |
| JP | A 2002-197615 | 7/2002 |
| JP | A 2004-127480 | 4/2004 |
| JP | A 2005-190518 | 7/2005 |

OTHER PUBLICATIONS

Atomic Layer Deposition; http://techsc.co.jp/products/mems/ALD.htm, TECHSCIENCE, LTD. 2006.

* cited by examiner

*Primary Examiner* — Joseph Feild
*Assistant Examiner* — Gustavo Polo
(74) *Attorney, Agent, or Firm* — Oliff & Berridge, PLC

(57) ABSTRACT

The present invention provides a perpendicular magnetic write head capable of preventing unintended erasure of information due to spread of a magnetic field for writing. A leading shield, two side shields, and a trailing shield are disposed around (a front end portion of) a main magnetic pole layer. A nonmagnetic layer having a uniform thickness formed by ALD is provided between the front end portion and two side shields. Consequently, intervals are constant in any positions. Spread of magnetic fields for recording in a write track width direction is suppressed sufficiently more than the case where the intervals vary among positions.

10 Claims, 15 Drawing Sheets

PERPENDICULAR MAGNETIC WRITE HEAD, HAVING SIDE SHIELDS COUPLED TO A LEADING SHIELD AND APART FROM A TRAILING SHIELD

CROSS REFERENCE TO RELATED APPLICATIONS

The present invention contains subject matter related to Japanese Patent Application JP 2006-305498 filed in the Japanese Patent Office on Nov. 10, 2006, the entire contents of which being incorporated herein by reference.

BACKGROUND OF THE INVENTION

1. Field of the Invention

The present invention relates to a perpendicular magnetic write head that executes a recording process of a perpendicular magnetic recording method, a method of manufacturing the same, and a magnetic recording apparatus on which the perpendicular magnetic write head is mounted.

2. Description of the Related Art

In recent years, as the surface recording density in a magnetic recording medium (hereinbelow, called "recording medium") such as a hard disk increases, improvement in the performance of a thin film magnetic head mounted on a magnetic recording apparatus such as a hard disk drive is in demand. Known recording methods of a thin film magnetic head include the longitudinal recording method of setting the direction of signal magnetic fields to an in-plane direction (longitudinal direction) of a recording medium and the perpendicular recording method of setting the direction of signal magnetic fields to a direction crossing the plane of the recording medium. At present, the longitudinal recording method is widely used. However, considering the market trend accompanying the improvement in surface recording density, it is assumed that the perpendicular recording method will be regarded as a more promising method in place of the longitudinal recording method in future. The perpendicular recording method has advantages such that linear recording density is higher and a recorded recording medium is not susceptible to the influence of thermal fluctuations.

A thin film magnetic head of the perpendicular recording method (hereinbelow, called "perpendicular magnetic write head") has a magnetic pole for generating a magnetic field for writing (so-called perpendicular magnetic field). With the perpendicular magnetic write head, a recording medium is magnetized by the magnetic field for writing, so that information is magnetically recorded on the recording medium.

A perpendicular magnetic write head having a magnetic pole which extends in the direction crossing the air bearing surface is known (refer to, for example, Japanese Unexamined Patent Application Publication Nos. H02-066710 and 2002-197615). The perpendicular magnetic write head of this kind is generally called a "single-magnetic-pole-type head". It is however said that the single-magnetic-pole-type head has limitation in improvement of recording density of a recording medium.

A perpendicular magnetic write head which is recently the mainstream has a shield for capturing a magnetic flux around the magnetic pole in order to suppress spread of the magnetic field for writing and prevent information recorded on a recording medium from being unintentionally erased. The perpendicular magnetic write head of this kind is generally called a "shield-type head". There are three kinds of shields: two side shields disposed on both sides of the magnetic pole in the write track width direction; a leading shield disposed on the leading side of the magnetic pole; and a trailing shield disposed on the trailing side of the magnetic pole. Known concrete structures of the perpendicular magnetic write head having the shields include a structure having only side shields (refer to, for example, Japanese Unexamined Patent Application Publication No. 2004-127480), a structure having only the trailing shield (refer to, for example, Japanese Unexamined Patent Application Publication No. 2001-250204 and European Patent Application Publication No. 0,360,978), a structure having the side shields and the leading shield (refer to, for example, U.S. Pat. No. 4,656,546), a structure having the side shields and the trailing shield (refer to, for example, Japanese Unexamined Patent Application Publication No. 2005-190518), and a structure having the side shields, the leading shield, and the trailing shield (refer to, for example, U.S. Pat. Nos. 6,954,340 and 7,042,682).

In the recent perpendicular magnetic write head manufacturing field, as a film forming method having extremely excellent film thickness controllability, ALD (Atomic Layer Deposition) is used (refer to, for example, "ALD atomic layer deposition apparatus", Techscience Ltd, (URL: http://techsc.co.jp/products/mems/ALD.htm)). The ALD is a method capable of forming an oxide film, a nitride film, a metal film or the like extremely thinly and densely under a high temperature condition of 150° C. or higher. The ALD is widely used in the manufacturing method strictly requested to have a physical parameter such as a withstand voltage. In the manufacture field of the perpendicular magnetic write head, the ALD is used in a step of forming a reproduction gap (refer to, for example, U.S. Pat. No. 6,759,081).

SUMMARY OF THE INVENTION

Although the conventional shield-type head has a shield for capturing the magnetic flux, spread of the recording magnetic field is not sufficiently suppressed. There is consequently a problem that it is difficult to prevent unintended erasure of information. Specifically, in these days when it is requested to more strictly prevent unintended erasure of information in association with dramatic increase in surface recording density, only by simply having the shield, spread of the recording magnetic field cannot be sufficiently suppressed any more.

It is therefore desirable to provide a perpendicular magnetic write head, a method of manufacturing the same, and a magnetic recording apparatus capable of preventing unintentional erasure of information caused by spread of a magnetic field for writing.

A first perpendicular magnetic write head of an embodiment of the present invention includes: a magnetic pole generating a magnetic field for writing; and a couple of side shields disposed on both sides of the magnetic pole in a write track width direction so as to be apart from the magnetic pole. An interval between the magnetic pole and each of the side shields is constant in any position. A second perpendicular magnetic write head of an embodiment of the invention includes: a magnetic pole generating a magnetic field for writing; a couple of side shields disposed on both sides of the magnetic pole in a write track width direction so as to be apart from the magnetic pole; a leading shield disposed on a leading side of the magnetic pole so as to be apart from the magnetic pole; and a trailing shield disposed on a trailing side of the magnetic pole so as to be apart from the magnetic pole. The side shields are coupled to the leading shield and are apart from the trailing shield. A third perpendicular magnetic write head of an embodiment of the invention includes: a magnetic pole generating a magnetic field for writing; a couple of side shields disposed on both sides of the magnetic pole in a write track width direction so as to be apart from the magnetic pole; a leading shield disposed on a leading side of the magnetic pole so as to be apart from the magnetic pole; and a trailing shield disposed on a trailing side of the magnetic pole so as to be apart from the magnetic pole. An interval between the magnetic pole and each of the side shields is constant in any position, and the two side shields are coupled to the leading shield and are apart from the trailing shield. A magnetic recording apparatus of an embodiment of the invention includes a recording medium, and the perpendicular magnetic write head.

A first method of manufacturing a perpendicular magnetic write head of an embodiment of the invention includes: a first step of forming, on a base, a photoresist pattern having an opening; a second step of forming a nonmagnetic layer with a uniform thickness, the nonmagnetic layer covering at least an inner wall of the photoresist pattern in the opening, thereby narrowing the opening; a third step of forming a magnetic pole that generates a magnetic field for writing so as to fill the opening covered with the nonmagnetic layer; a fourth step of removing the remaining photoresist pattern; and a fifth step of forming a couple of side shields on both sides of the magnetic pole in a write track width direction so as to be apart from the magnetic pole with the nonmagnetic layer in between. A second method of manufacturing a perpendicular magnetic write head of an embodiment of the invention includes: a first step of forming, on a base, a leading shield; a second step of forming, on the leading shield, a photoresist pattern having an opening; a third step of forming a first nonmagnetic layer covering at least an inner wall of the photoresist pattern in the opening, thereby narrowing the opening; a fourth step of forming a magnetic pole that generates a magnetic field for writing so as to fill the opening covered with the first nonmagnetic layer; a fifth step of removing the remaining photoresist pattern; a sixth step of growing a plating film on the leading shield as a seed electrode film on both sides of the magnetic pole in a write track width direction, thereby forming a couple of side shields so as to be apart from the magnetic pole with the first nonmagnetic layer in between; a seventh step of forming a second nonmagnetic layer on the magnetic pole, the first nonmagnetic layer, and the side shields; and an eighth step of forming a trailing shield on the second nonmagnetic layer.

In the first perpendicular magnetic write head and the method of manufacturing the same of the embodiment of the invention, the interval between the magnetic pole and each of the side shields is constant in any position. Consequently, as compared with the case where the interval varies according to positions, the side shields can capture spread components of the magnetic flux more easily. In the second perpendicular magnetic write head and the method of manufacturing the same of the embodiment of the invention, the side shields are coupled to the leading shield and are apart from the trailing shield. Consequently, as compared with the case where the side shields are coupled to the leading shield and the trailing shield, the side shields can capture spread components of the magnetic flux more easily. In the third perpendicular magnetic write head of the embodiment of the invention, the interval between the magnetic pole and each of the side shields is constant in any position, and the side shields are coupled to the leading shield and are apart from the trailing shield. Therefore, the effects produced by the perpendicular magnetic write heads of the embodiments are obtained.

In the first perpendicular magnetic write head of the embodiment of the invention, preferably, a nonmagnetic layer having uniform thickness and formed by the ALD is provided at least between the magnetic pole and each of the side shields. Preferably, a trailing shield is disposed on a trailing side of the magnetic pole so as to be apart from the magnetic pole, and a leading shield is disposed on a leading side of the magnetic pole so as to be apart from the magnetic pole. An end face of the magnetic pole on an air bearing surface may have an inverted trapezoidal shape. In the second perpendicular magnetic write head of the embodiment of the invention, preferably, the leading shield is an electrode film, and the side shields are formed by selectively growing a plating film on the leading shield as a seed electrode film. In the third perpendicular magnetic write head of the embodiment of the invention, preferably, a rear portion of the trailing shield is coupled to the magnetic pole with a magnetic member for coupling in between. In the magnetic recording apparatus according to the invention, the recording medium may include a magnetization layer disposed on the side close to the perpendicular magnetic write head and a soft magnetic layer disposed on the side far from the perpendicular magnetic write head.

In the first method of manufacturing a perpendicular magnetic write head of the embodiment of the invention, preferably, the nonmagnetic layer is formed by using the ALD in the second step, and the film formation temperature of the ALD is lower than glass transition temperature of the photoresist pattern. The third step may include steps of: forming a magnetic layer so as to fill at least the opening covered with the nonmagnetic layer; and selectively removing the layers on the photoresist pattern until the photoresist pattern is exposed. In the first step, the opening may be formed so as to gradually widen with distance from the base. In the third step, an end face of the magnetic pole on the air bearing surface may be formed to have an inverted trapezoidal shape. In the second method of manufacturing a perpendicular magnetic write head of the embodiment of the invention, the fourth step may include steps of: forming the first magnetic layer so as to fill at least the opening covered with the first nonmagnetic layer; and selectively removing the layers on the photoresist pattern until the photoresist pattern is exposed. The sixth step may include steps of: forming the second magnetic layer so as to cover at least the magnetic pole and the first nonmagnetic layer; and selectively removing the second magnetic layer until the magnetic pole and the first nonmagnetic layer are exposed. The first nonmagnetic layer may have a uniform thickness. Preferably, in the eighth step, a rear portion of the trailing shield is coupled to the magnetic pole with a magnetic member for coupling in between.

In the perpendicular magnetic write head of the embodiments of the invention, the method of manufacturing the same, and the magnetic recording apparatus, (1) the interval between the magnetic pole and each of the side shields is constant in any position, (2) the side shields are coupled to the leading shield and are apart from the trailing shield, and (3) the interval between the magnetic pole and each of the side shields is constant in any position, and the side shields are coupled to the leading shield and are apart from the trailing shield, so that spread of the magnetic field for writing is sufficiently suppressed. Therefore, unintentional erasure of information caused by spread of the magnetic fields for recording can be prevented.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

Figures 1A, 1B:
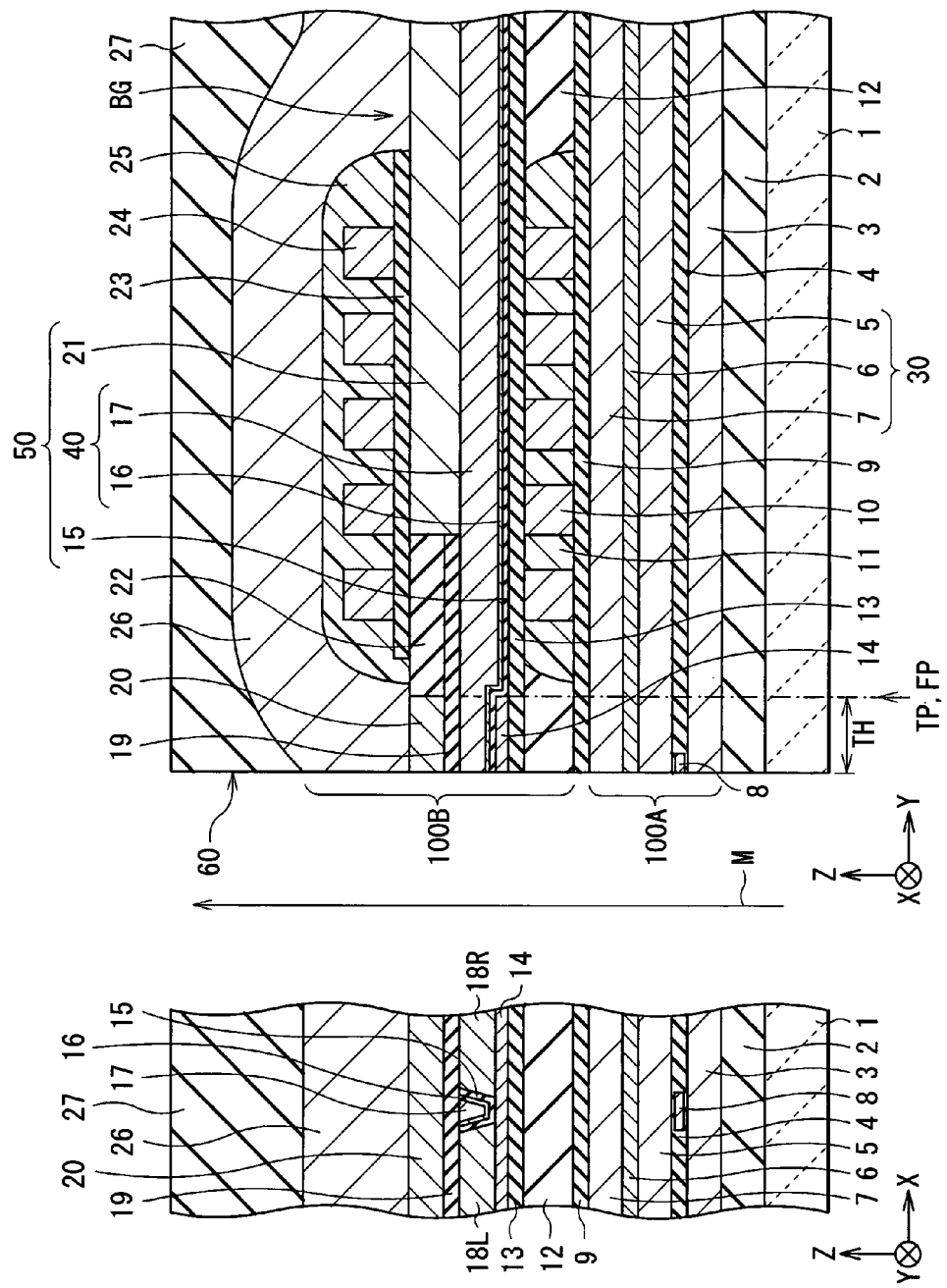
FIGS. 1A and 1B are cross sections showing a configuration of a thin film magnetic head having a perpendicular magnetic write head as an embodiment of the present invention.
Figure 2:
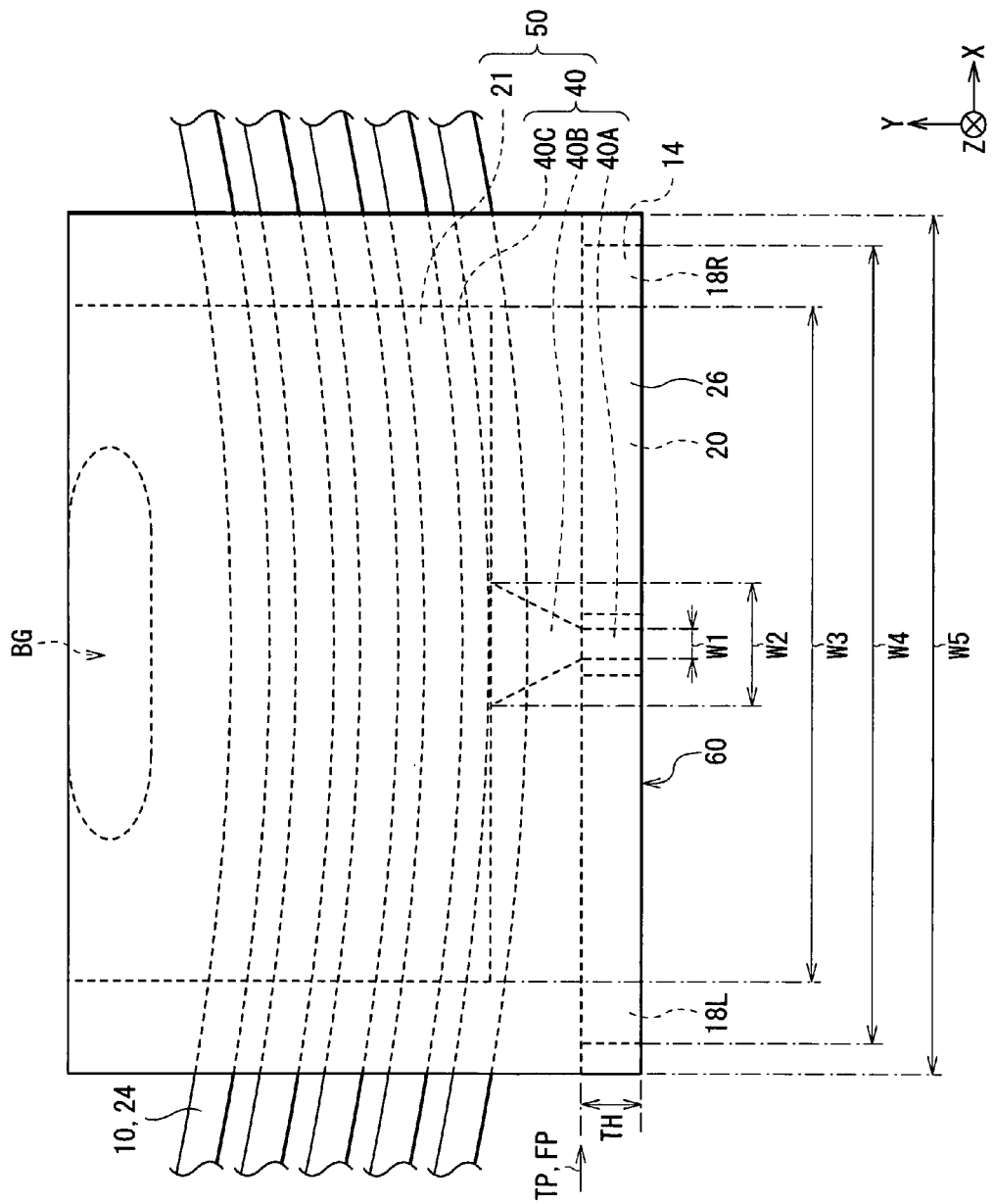
FIG. 2 is a plan-view showing a configuration of a main part of the thin film magnetic head illustrated in FIG. 1.
Figure 3:
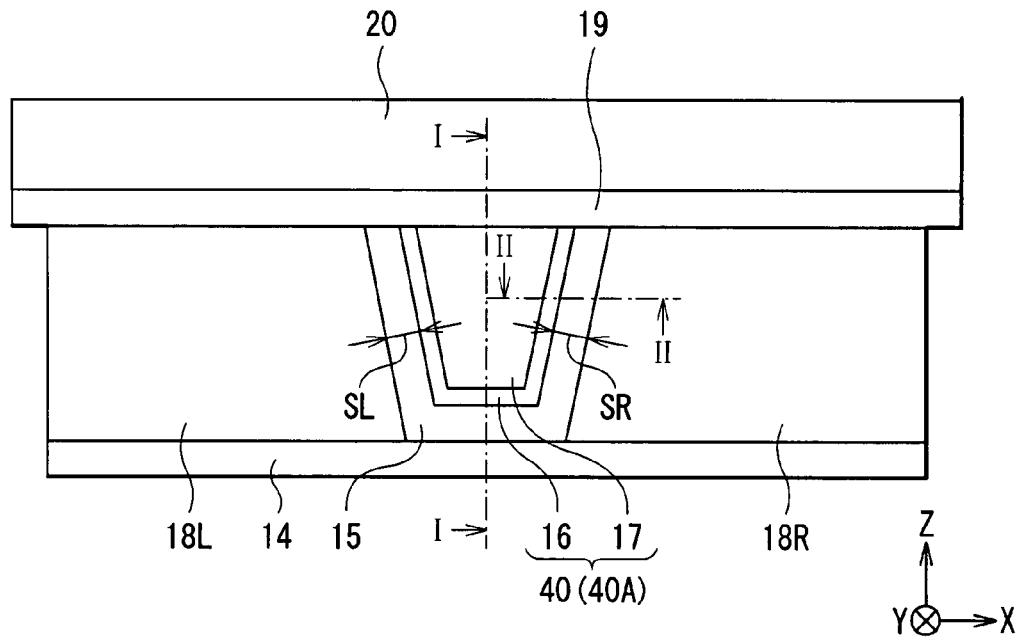
FIG. 3 is a plan view showing a configuration of an end face of the main part of the thin film magnetic head illustrated in FIG. 1.
Figure 4:
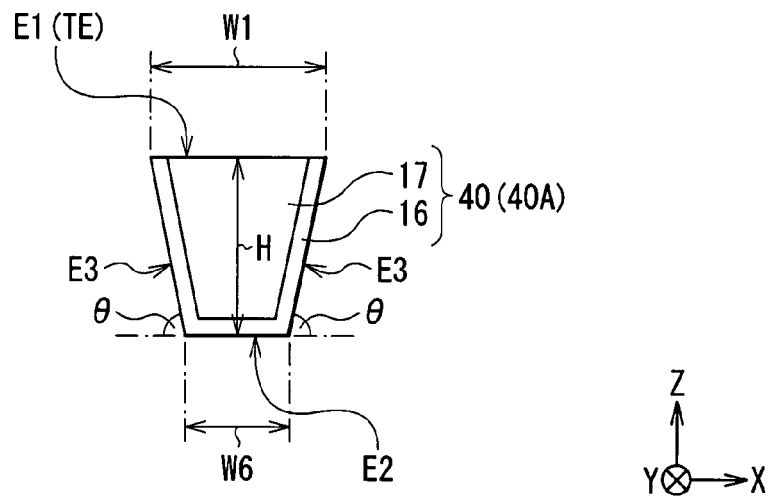
FIG. 4 is a plan view showing another configuration of an end face of the main part of the thin film magnetic head illustrated in FIG. 1.
Figure 5:
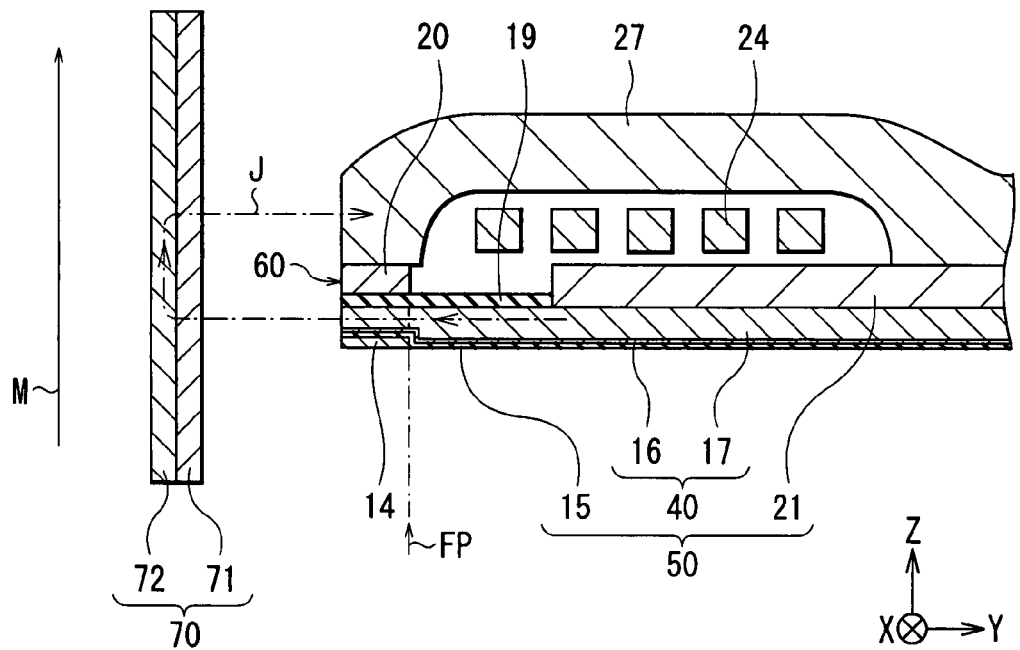
FIG. 5 is a cross section showing a configuration of a main part of the thin film magnetic head illustrated in FIG. 1.

First, the configuration of a thin film magnetic head having a perpendicular magnetic write head as an embodiment of the invention will be described. FIGS. 1A and 1B to FIG. 5 show the configuration of the thin film magnetic head. FIGS. 1A and 1B show a general sectional configuration. FIG. 2 is a plan view showing a configuration of a main part. FIGS. 3 and 4 show the configuration of an end face of the main part. FIG. 5 shows a sectional configuration of the main part including the thin film magnetic head and also a recording medium 70. The up-arrows shown in FIGS. 1A and 1B and FIG. 5 express the direction of travel (travel direction M) of the recording medium 70 relative to the thin film magnetic head. FIG. 1A shows a section parallel to an air bearing surface 60 facing the recording medium 70. FIG. 1B shows a section perpendicular to the air bearing surface 60.

In the following description, the dimensions in the X, Y, and Z-axis directions shown in FIGS. 1A and 1B to FIG. 5 are expressed as "width", "length", and "thickness, height, or depth", respectively. The side close the air bearing surface 60 and the side far from the air bearing surface 60 in the Y-axis direction will be expressed as "forward" and "rearward", respectively. The expressions will be similarly used in FIG. 6 and subsequent diagrams.

The thin film magnetic head performs magnetic processes on the recording medium 70 (such as a hard disk) shown in FIG. 5. The thin film magnetic head is, for example, a composite head capable of executing both of a reproducing process and a recording process as the magnetic processes. In the thin film magnetic head, for example, as shown in FIGS. 1A and 1B, an insulating layer 2, a reproduction head part 100A executing a reproducing process by using the MR (Magneto-Resistive) effect, a separating layer 9, a recording head part 100B executing a recording process in the perpendicular recording method, and an overcoat layer 27 are stacked in order over a substrate 1. The substrate 1 is made of a ceramic material such as AlTic ($Al_2O_3$.TiC). The insulating layer 2, the separating layer 9, and the overcoat layer 27 are made of a nonmagnetic insulating material such as aluminum oxide ($Al_2O_3$, hereinbelow, called "alumina").

The reproduction head part 100A is obtained by stacking, for example, a lower lead shield layer 3, a shield gap film 4, and an upper lead shield layer 30 in this order. In the shield gap film 4, a reproduction element (MR element 8) is buried so as to be exposed from the air bearing surface 60.

The lower lead shield layer 3 and the upper lead shield layer 30 are provided to magnetically isolate the MR element 8 from the periphery and extend rearward from the air bearing surface 60. The lower lead shield layer 3 is made of a magnetic material such as nickel iron alloy (NiFe (for example, Ni: 80 weight % and Fe: 20 weight %), hereinbelow, called "permalloy (trademark)"). The upper lead shield layer 30 is obtained by stacking, for example, two upper lead shield layers 5 and 7 with a nonmagnetic layer 6 in between. Each of the upper lead shield layers 5 and 7 is made of a magnetic material such as permalloy. The nonmagnetic layer 6 is made of a nonmagnetic material such as ruthenium (Ru) or alumina. The upper lead shield layer 30 does not always have to have the stack structure but may have a single-layer structure made of a magnetic material.

The shield gap film 4 is provided to electrically isolate the MR element 8 from the periphery and is made of, for example, a nonmagnetic insulating material such as alumina. The MR element 8 uses, for example, the GMR (Giant Magneto-Resistive) effect, the TMR (Tunneling Magneto-Resistive) effect, or the like.

The recording head part 100B is a perpendicular magnetic write head and so-called shield-type head in which, for example, a thin film coil 10 as a first layer coil buried by insulating layers 11, 12, and 13, a leading shield 14, two side shields 18R and 18L, a magnetic pole layer 50, a gap layer 19, a trailing shield 20, an insulating layer 22, a thin film coil 24 as a second layer coil buried by insulating layers 23 and 25, and a return yoke 26 are staked in order.

The thin film coil 10 generates a leakage suppressing magnetic flux in order to prevent leakage of a recording magnetic flux (prevent unintended transmission of the recording magnetic flux to the reproduction head part 100A) generated by the thin film coil 24. The thin film coil 10 is made of, for example, a high-conductive material such as copper (Cu) and has a structure winding around a back gap BG as a center (spiral structure) as shown in FIGS. 1A and 1B and FIG. 2. The number of windings (the number of turns) of the thin film coil 10 can be set arbitrarily. Preferably, the number of turns is equal to that of the thin film coil 24.

The insulating layers 11 to 13 are provided to electrically isolate the thin film coil 10 from the periphery. The insulating layer 11 is disposed between the turns of the thin film coil 10 and around the thin film coil 10 and is made of a nonmagnetic insulating material such as photoresist or spin on glass (SOG) displaying flowability when heated. The insulating layer 12 is disposed around the insulating layer 11 and is made of a nonmagnetic insulating material such as alumina. The insulating layer 13 is disposed so as to cover the thin film coil 10 and the insulating layers 11 and 12 and is made of, for example, a nonmagnetic insulating material similar to that of the insulating layer 12.

The magnetic pole layer 50 generates a recording magnetic field by guiding the magnetic flux generated by the thin film coil 24 to the recording medium 70. For example, the magnetic pole layer 50 extends rearward from the air bearing surface 60. The magnetic pole layer 50 is obtained by stacking, for example, a nonmagnetic layer 15, a main magnetic pole layer 40, and an auxiliary magnetic pole layer 21 in order.

The nonmagnetic layer 15 is used to form the main magnetic pole layer 40 in the process of manufacturing a thin film magnetic head and, for example, extends rearward from the air bearing surface 60. The nonmagnetic layer 15 is made of a nonmagnetic material such as alumina or aluminum nitride. The sectional shape parallel with the air bearing surface 60 of the nonmagnetic layer 15 is a U shape as shown in FIG. 1A and FIG. 3. A main part (a below-mentioned front end part 40A) of the main magnetic pole layer 40 is buried in the nonmagnetic layer 15. In particular, the nonmagnetic layer 15 is formed by, for example, the dry film forming method having excellent film thickness controllability. The nonmagnetic layer 15 has uniform thickness around the main magnetic pole layer 40. As the dry film forming method, for example, to make the thickness of the nonmagnetic layer 15 strictly uniform, the ALD is preferable. In FIG. 2, the nonmagnetic layer 15 is not shown.

The nonmagnetic layer 15 is made of a nonmagnetic insulating material (for example, alumina) similar to that of the insulating layers 12 and 13. In the case where the nonmagnetic layer 15 is formed by the ALD, the nonmagnetic layer 15 has a composition different from that of the insulating layers 12 and 13 and the like according to the forming method. Specifically, the insulating layers 12 and 13 contain inert gas due to the fact that they are formed by sputtering or the like using inert gas. The inert gas is, for example, argon (Ar), krypton (Kr), xenon (Xe) or the like. On the other hand, the nonmagnetic layer 15 does not contain inert gas since it is formed by the ALD or the like using no inert gas. Whether the inert gas is contained or not can be specified by using composition analysis such as STEM (Scanning Transmission Electron Microscopy)-EDS (Energy-Dispersive X-ray Spectroscopy).

The amount of a specific component in the nonmagnetic layer 15 formed by the ALD varies according to the forming methods. That is, the ALD uses water and trimethyl aluminum (TMA). On the other hand, the sputtering does not use the water and the like, so that the content of hydrogen (H) in the nonmagnetic layer 15 is larger than that in the insulating layers 12 and 13 and the like.

The main magnetic pole layer 40 is a main magnetic flux receiving part and a magnetic flux emitting part. For example, the main magnetic pole layer 40 extends rearward from the air bearing surface 60. As shown in FIG. 2, the main magnetic pole layer 40 has, for example, a battledore shape in plan view. Specifically, the main magnetic pole layer 40 includes, for example, in order from the air bearing surface 60, the front end portion 40A having a uniform width W1 specifying a write track width, an intermediate portion 40B gradually widened from the width W1 to a width W2 larger than the width W1, and a rear end portion 40C having a uniform width W3 larger than the width W2. The front end portion 40A is a part (so-called magnetic pole) substantially generating a recording magnetic field by emitting a magnetic flux toward the recording medium 70. The position at which the width of the main magnetic pole layer 40 starts spreading from the width W1 is a so-called flare point FP.

The end face of the main magnetic pole layer 40 on the side close to the air bearing surface 60 has, for example, as shown in FIGS. 3 and 4, an inverted trapezoidal shape (having a height H) using a long side positioned on the trailing side and a short side positioned on the leading side as upper and lower bottoms, respectively. Concretely, as shown in FIG. 4, the end face of the main magnetic pole layer 40 has a shape defined by an upper edge E1 (width W1) positioned on the trailing side, a lower edge E2 (width W6) positioned on the leading side, and two side edges E3. The width W6 is smaller than the width W1. The upper edge E1 is a substantial recording position (so called trailing edge TE) in the magnetic pole layer 40. The width W1 is, for example, 0.2 μm or less. The bevel angle θ of the end face of the main magnetic pole layer 40 (the angle between the extension direction of the lower edge E2 and the side edge E3) can be set arbitrarily in the range, for example, smaller than 90°. The "trailing side" is the outflow side (the front side in the travel direction M) when the travel state of the recording medium 70 in the travel direction M is regarded as a flow. In this case, the trailing side is the upper side in the thickness direction (Z-axis direction). In contrast, the inflow direction (the rear side in the travel direction M) is called a "leading side" and is the lower side in the thickness direction.

For example, the main magnetic pole layer 40 includes a seed layer 16 and a plating layer 17 formed on the seed layer 16. The seed layer 16 is used as an electrode film to grow the plating layer 17 in the thin film magnetic head manufacturing process and is made of a magnetic material similar to that of the plating layer 17. The plating layer 17 is made of a magnetic material having high saturation magnetic flux density such as an iron-based alloy. Examples of the iron-based alloy are an iron cobalt alloy (FeCo) and a cobalt iron nickel alloy (CoFeNi).

An auxiliary magnetic pole layer 21 has an auxiliary magnetic flux receiving part and, for example, extends rearward from a position receded from the air bearing surface 60. The auxiliary magnetic pole layer 21 is disposed, for example, on the trailing side of the main magnetic layer 40 and has, as shown in FIG. 2, a rectangular shape (width W3) in plan view.

The leading shield 14 is disposed so as to be apart (magnetically isolated) on the leading side of the main magnetic pole layer 40 (the front end portion 40A) with the nonmagnetic layer 15 in between, thereby capturing spread components in a magnetic flux to be recorded (magnetic flux emitted from the main magnetic pole layer 40 toward the recording medium 70). The leading shield 14 extends, for example, from the air bearing surface 60 to the flare point FP and, as shown in FIG. 2, has a rectangular shape in plan view (width W4 larger than the width W3). In particular, the leading shield 14 is an electrode film (seed layer) for forming the two side shields 18R and 18L by growing a plating film in the thin film magnetic head manufacturing process and is made of, for example, a magnetic material having high saturation magnetic flux density such as permalloy or an iron-based alloy. The thickness of the leading shield 14 is, for example, 0.2 μm. The thin film magnetic head does not always have to have the leading shield 14.

The two side shields 18R and 18L are disposed so as to be apart from each other (magnetically separated from each other) on both sides of the main magnetic pole layer 40 (the front end portion 40A) in the write track width direction (X-axis direction) with the nonmagnetic layer 15 in between, thereby capturing spread components in the magnetic flux to be recorded. The side shields 18R and 18L are formed by growing a plating film using the leading shield 14 as an electrode film in the thin film magnetic head manufacturing process and extend, for example, from the air bearing surface 60 to the flare point FP. The side shields 18R and 18L are made of, for example, a magnetic material similar to that of the leading shield 14 and has a rectangular shape in plan view as shown in FIG. 2.

The gap layer 19 is a gap for magnetically separating the magnetic pole layer 50 and the trailing shield 20 from each other and is made of a nonmagnetic insulating material such as alumina or a nonmagnetic conductive material such as ruthenium. The thickness of the gap layer 19 is about 0.03 μm to 0.1 μm.

The trailing shield 20 is disposed so as to be apart (magnetically isolated) on the trailing side of the main magnetic pole layer 40 (the front end portion 40A) with the gap layer 19 in between, thereby capturing spread components in a magnetic flux to be recorded. In particular, the trailing shield 20 captures the magnetic flux, thereby (1) increasing the gradient of the recording magnetic flux, (2) narrowing the recording width, and (3) including an oblique magnetic field component into the recording magnetic field. The trailing shield 20 functions as a so-called write shield. The trailing shield 20 extends, for example, from the air bearing surface 60 to the flare point FP while being adjacent to the gap layer 19, and its rear end is adjacent to the insulating layer 22. The trailing shield 20 plays the role of specifying the front position of the insulating layer 22 (the throat height zero position TP). The trailing shield 20 is made of, for example, a magnetic material similar to that of the leading shield 14 and has, as shown in FIG. 2, a rectangular shape in plan view (having a width W5 larger than the width W4).

The front portion of the trailing shield 20 is apart (magnetically separated) from the front end portion 40A with the gap layer 19 in between and the rear portion is (magnetically) coupled to the front end portion 40A with a magnetic member for coupling in between. The magnetic member for coupling is, for example, the intermediate portion 40B, the rear end portion 40C, the auxiliary magnetic pole layer 21, and the return yoke 26.

The insulating layer 22 specifies the throat height TH as one of important factors determining the recording characteristics of the thin film magnetic head and is filled between the trailing shield 20 and the auxiliary magnetic pole layer 21. The front position of the insulating layer 22 is the throat height zero position TP. The distance between the throat height zero position TP and the air bearing surface 60 is so-called throat height TH. The insulating layer 22 is, for example, made of the nonmagnetic insulating material such as alumina. FIGS. 1A and 1B and FIG. 2 show, as an example, the case where the throat height zero position TP coincides with the flare point FP.

The thin film coil 24 generates the recording magnetic flux. In the thin film coil 24, for example, current flows in the direction opposite to that of current in the thin film coil 10. The material, thickness, and stereoscopic structure other than the above related to the thin film coil 24 are similar to those of the thin film coil 10.

The insulating layers 23 and 25 electrically isolate the thin film coil 24 from the periphery. The insulating layer 23 is the base of the thin film coil 24 and is made of, for example, a nonmagnetic insulating material similar to that of the insulating layer 12. The insulating layer 25 is disposed so as to cover the insulating layer 23 in cooperation with the thin film coil 24. For example, the insulating layer 25 is made of a nonmagnetic insulating material similar to that of the insulating layer 11. The insulating layers 23 and 25 are coupled to the insulating layer 22 and, for example, the front end of the insulating layer 25 recedes from that of the insulating layer 22.

The return yoke 26 captures the magnetic flux after recording (the magnetic flux returned from the recording medium 70 to the thin film magnetic head), thereby circulating the magnetic flux between the recording head part 100B and the recording medium 70. Not only the return yoke 26 but also the trailing shield 20 play the role of the magnetic flux circulating function. The return yoke 26 extends rearward, for example, from the air bearing surface 60 on the trailing side of the trailing shield 20. The front portion of the return yoke 26 is coupled to the trailing shield 20 and the rear portion is coupled to the magnetic pole layer 50 via the back gap BG. The return yoke 26 is made of, for example, a magnetic material similar to that of the leading shield 14 and has a rectangular shape in plan view (width W5) as shown in FIG. 2.

In the thin film magnetic head, to sufficiently suppress spread of the recording magnetic field, as shown in FIG. 3, the main magnetic pole layer 40 (the front end portion 40A) is surrounded from all around by the leading shield 14, the two side shields 18R and 18L, and the trailing shield 20.

In this case, as described above, since the thickness of the nonmagnetic layer 15 is uniform, each of the side shields 18R and 18L is apart from the front end portion 40A with a predetermined interval. Specifically, an interval SR between the front end portion 40A and the side shield 18R and an interval SL between the front end portion 40A and the side shield 18L are constant in any of positions. Consequently, the facing side faces between the front end portion 40A and the side shields 18R and 18L are parallel with each other.

As described above, on the side close to the air bearing surface 60, in the case where the leading shield 14 and the side shields 18R and 18L are apart from the front end portion 40A with the nonmagnetic layer 15 in between and the trailing shield 20 is apart from the front end portion 40A with the gap layer 19 in between, the side shields 18R and 18L are coupled to the leading shield 14 and apart from the trailing shield 20 with the gap layer 19 in between.

The recording medium 70 has, for example, as shown in FIG. 5, a stack structure including a magnetization layer 71 and a soft magnetic layer 72 disposed on the sides close to and far from the thin film magnetic head, respectively. In the magnetization layer 71, information is magnetically recorded. The soft magnetic layer 72 functions as a flux path in the recording medium 70. The recording medium 70 of this kind is generally called a two-layer recording medium for perpendicular recording. Obviously, the recording medium 70 may include, for example, layer(s) in addition to the magnetization layer 71 and the soft magnetic layer 72.

The thin film magnetic head operates as follows.

As shown in FIGS. 1A and 1B to FIG. 5, when current flows from a not-shown external circuit to the thin film coil 24 in the recording head part 100B at the time of recording information, a magnetic flux J for recording is generated. The magnetic flux J is received by the main magnetic pole layer 40 and the auxiliary magnetic pole layer 21 in the magnetic pole layer 50 and, after that, flows to the front end portion 40A. The magnetic flux J is condensed by being narrowed at the flare point FP and is finally concentrated on a portion around the trailing edge TE. The magnetic flux J concentrated on the portion around the trailing edge TE is emitted to the outside, thereby generating a magnetic field for writing (perpendicular magnetic field). With the generated magnetic field, the magnetization layer 71 is magnetized, and information is magnetically recorded on the recording medium 70.

In this case, the currents flow in opposite directions in the thin film coils 10 and 24, so that magnetic fluxes in opposite directions are generated in the thin film coils 10 and 24. Concretely, with reference to FIGS. 1A and 1B, the magnetic flux for suppressing leakage is generated upward in the thin film coil 10. On the other hand, the magnetic flux for recording is generated downward in the thin film coil 24. By the influence of the magnetic flux for suppressing leakage, the flow of the magnetic flux for recording from the recording head part 100B to the reproduction head part 100A is disturbed. Consequently, leakage of the magnetic flux for recording (unintended transmission of the magnetic flux for recording to the reproduction head part 100A) can be suppressed. As a result, deterioration in the detection precision of the MR element 8 due to the influence of the magnetic flux for recording is suppressed. It also suppresses unintended erasure of information recorded on the recording medium 70 by unnecessary magnetic fields generated by capture of the magnetic flux for recording in the lower and upper lead shield layers 3 and 30.

When the magnetic flux J is emitted from the front end portion 40A, spread components in the magnetic flux J are captured by the leading shield 14, the two side shields 18R and 18L, and the trailing shield 20, so that spread of the magnetic field for writing is suppressed. The magnetic flux captured by the trailing shield 20 is re-supplied to the main magnetic pole layer 40 via the return yoke 26.

The magnetic flux J emitted from the main magnetic pole layer 40 to the recording medium 70 magnetizes the magnetization layer 71 and is captured by the return yoke 26 via the soft magnetic layer 72. A part of the magnetic flux J is captured also by the trailing shield 20. The captured magnetic flux J is also re-supplied to the main magnetic pole layer 40. Since the magnetic flux J circulates between the recording head part 100B and the recording medium 70, a magnetic circuit is configured.

On the other hand, at the time of reproducing information, when sense current flows in the MR element 8 in the reproduction head part 100A, the resistance value of the MR element 8 changes according to a signal magnetic field for reproduction from the recording medium 70. By detecting a resistance change as a voltage change, information recorded on the recording medium 70 is magnetically reproduced.

Next, a method of manufacturing a thin film magnetic head will be described. FIGS. 6 to 14 show processes of manufacturing the thin film magnetic head. Each of the diagrams shows a sectional configuration corresponding to FIG. 1A.

In the following, first, outline of a process of manufacturing a thin film magnetic head will be described with reference to FIGS. 1A and 1B. After that, with reference to FIGS. 1A and 1B to FIG. 14, the process of forming the main part of the recording head part 100B to which a method of manufacturing a perpendicular magnetic write head as an embodiment of the invention is applied will be described in detail. Since the materials, dimensions, and structures of components of the thin film magnetic head have been already described in detail, the description will not be repeated.

The thin film magnetic head is manufactured by sequentially forming and stacking components by using existing thin film processes including, mainly, the film forming technique typified by plating and sputtering, the patterning technique typified by photolithography, the etching technique typified by dry etching and wet etching, and the removing technique typified by CMP (Chemical Mechanical Polishing). Specifically, at the time of manufacturing a thin film magnetic head, as shown in FIGS. 1A and 1B, first, the insulating layer 2 is formed on the substrate 1. After that, the lower lead shield layer 3, the shield gap film 4 in which the MR element 8 is buried, and the upper lead shield layer 30 (the upper lead shield layer parts 5 and 7 and the nonmagnetic layer 6) are stacked over the insulating layer 2 in accordance with this order, thereby forming the reproduction head part 100A. Subsequently, the separating layer 9 is formed on the reproduction head part 100A. Over the separating layer 9, by sequentially stacking the thin film coil 10 buried with the insulating layers 11 to 13, the leading shield 14, the two side shields 18R and 18L, the magnetic pole layer 50 (the nonmagnetic layer 15, the main magnetic pole layer 40, and the auxiliary magnetic pole layer 21), the gap layer 19, the trailing shield 20, the insulating layer 22, the thin film coil 24 buried with the insulating layers 23 and 25, and the return yoke 26, the recording head part 100B is formed. Finally, the overcoat layer 27 is formed on the recording head part 100B, and the air bearing surface 60 is formed by using the mechanical process and polishing process, thereby completing the thin film magnetic head.

Figure 6:
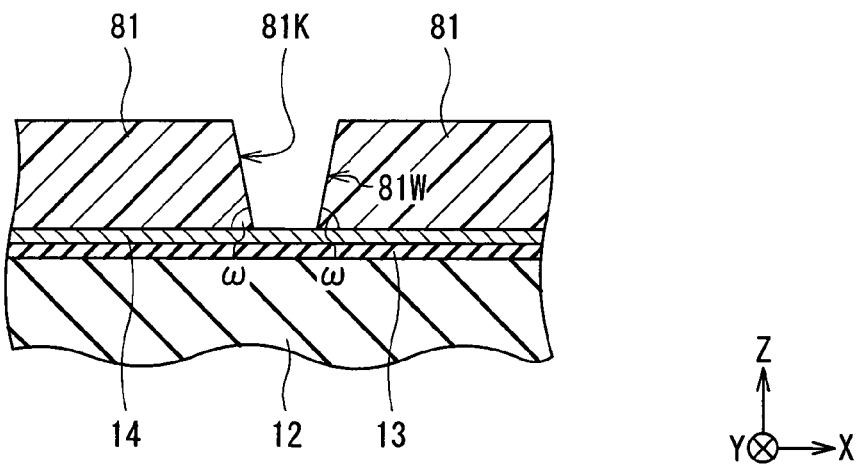
FIG. 6 is a cross section illustrating a process in a method of manufacturing a thin film magnetic head having a perpendicular magnetic write head as an embodiment of the invention.

At the time of forming the main part of the recording head part 100B, the insulating layer 13 is formed as a base. After that, as shown in FIG. 6, the leading shield 14 is formed on the insulating layer 13 by using, for example, sputtering.

Subsequently, a resist pattern 81 having an opening 81K is formed on the leading shield 14. At the time of forming the resist pattern 81, a resist is applied on the surface of the leading shield 14 to form a resist film. After that, the resist film is patterned (exposed and developed) by using the photolithography. In this case, exposure parameters are adjusted so that the opening 81K gradually widens with distance from the leading shield 14 and the tilt angle ω of an inner wall 81W (the angle formed by the inner wall 81W and the surface of the leading shield 14) becomes equal to the bevel angle θ (refer to FIG. 4).

Figure 7:
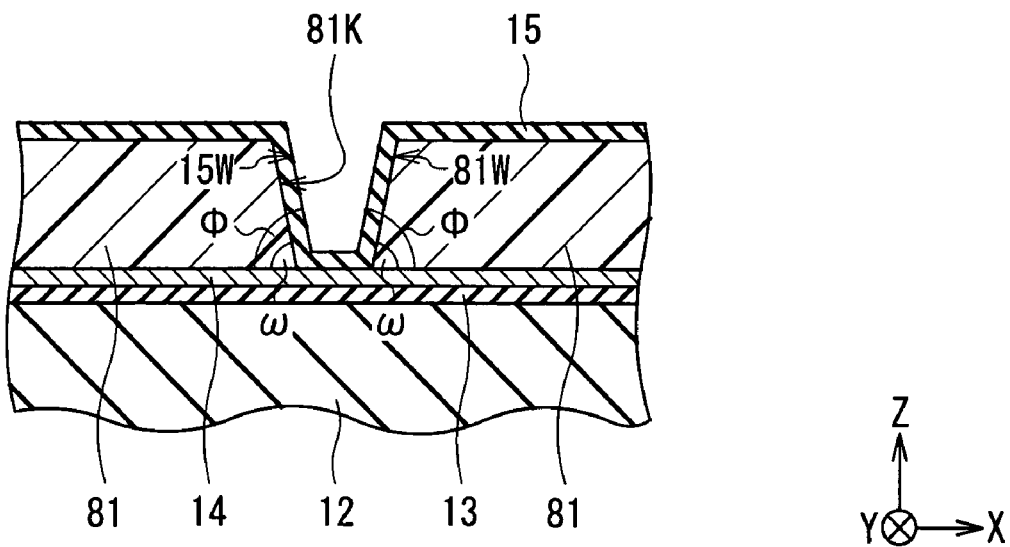
FIG. 7 is a cross section illustrating a process subsequent to FIG. 6.

As shown in FIG. 7, the inner wall 81W of the resist pattern 81 at least in the opening 81K is covered with a film having uniform thickness by using the dry film forming method, thereby forming the nonmagnetic layer 15 as a first nonmagnetic layer so as to narrow the opening 81K. At the time of forming the nonmagnetic layer 15, for example, by using the ALD method, the surface of the resist pattern 81 (including the inner wall 81W) and the exposed surface of the leading shield 14 in the opening 81K are covered. In this case, particularly, the film formation temperature of the ALD method (so-called substrate temperature) is set to be lower than modification temperature of the resist pattern 81 (glass transition temperature). By using the ALD method, the inner wall 81W is covered with the nonmagnetic layer 15 having uniform thickness. Consequently, the tilt angle Φ of the inner wall 15W of the nonmagnetic layer 15 corresponding to the inner wall 81W (the angle between the inner wall 15W and the surface of the leading shield 14) becomes equal to the tilt angle ω.

Figure 8:
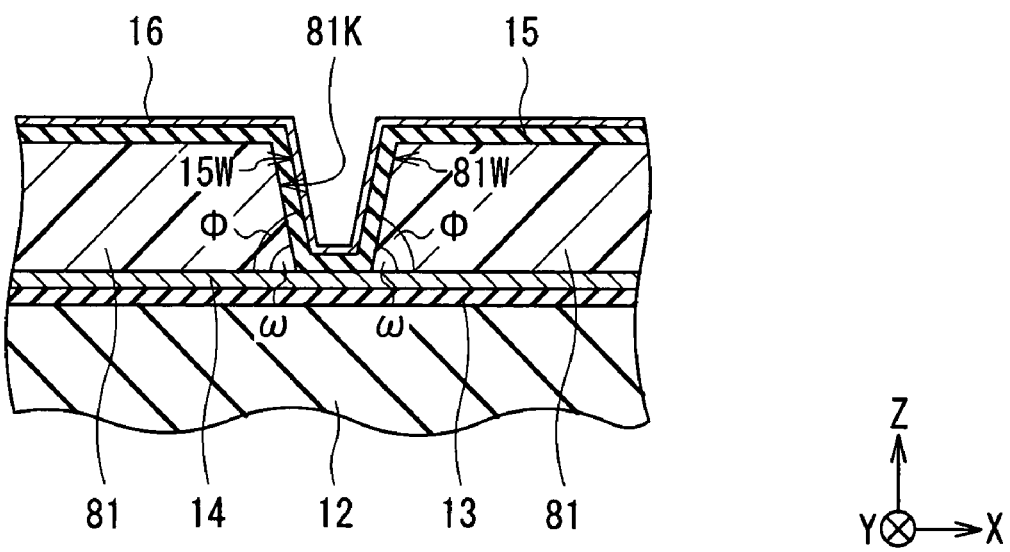
FIG. 8 is a cross section illustrating a process subsequent to FIG. 7.
Figure 9:
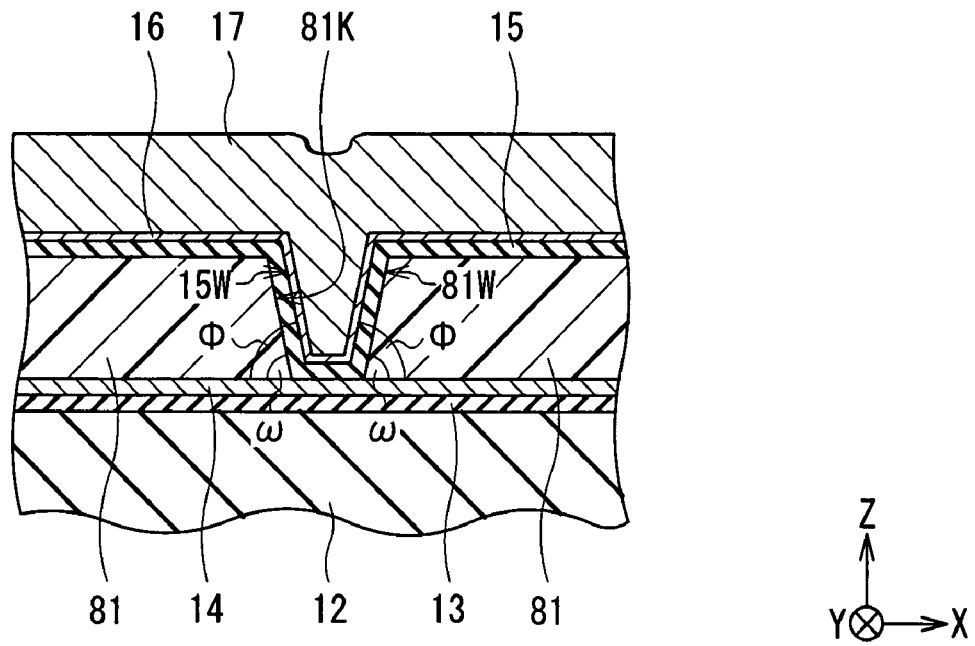
FIG. 9 is a cross section illustrating a process subsequent to FIG. 8.
Figure 10:
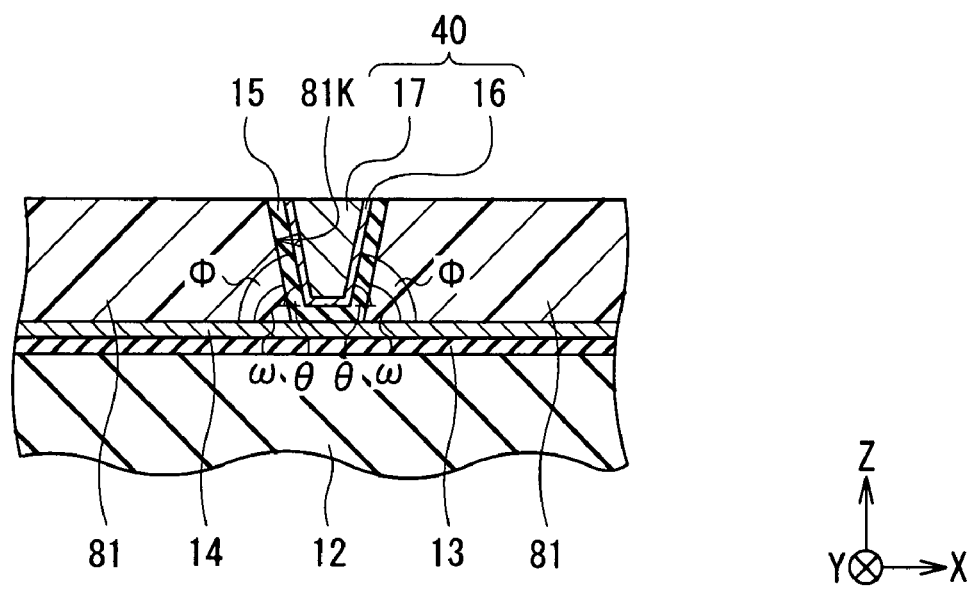
FIG. 10 is a cross section illustrating a process subsequent to FIG. 9.

Subsequently, as shown in FIGS. 8 to 10, the main magnetic pole layer 40 is formed so as to fill the opening 81K in which the nonmagnetic layer 15 is formed.

At the time of forming the main magnetic pole layer 40, the seed layer 16 and the plating layer 17 are formed as a first magnetic layer for forming the main magnetic pole layer 40 so as to fill at least the opening 81K in which the nonmagnetic layer 15 is formed. That is, for example, as shown in FIG. 8, the seed layer 16 is formed on the nonmagnetic layer 15 by sputtering. After that, as shown in FIG. 9, a plating film is grown using the seed layer 16 as an electrode film, thereby forming the plating layer 17 on the seed layer 16 so as to fill the opening 81K.

After that, by using polishing such as CMP or etching such as ion milling or reactive ion etching (RIE), the nonmagnetic layer 15, the seed layer 16, and the plating layer 17 are selectively removed until at least the resist pattern 81 is exposed. As a result, as shown in FIG. 10, the main magnetic pole layer 40 is formed so as to fill the opening 81K in which the nonmagnetic layer 15 is formed. At the time of forming the main magnetic pole layer 40, the bevel angle θ is determined so as to be equal to the tilt angle Φ of the nonmagnetic layer 15. That is, the bevel angle θ becomes equal to the tilt angle ω of the resist pattern 81.

Figure 11:
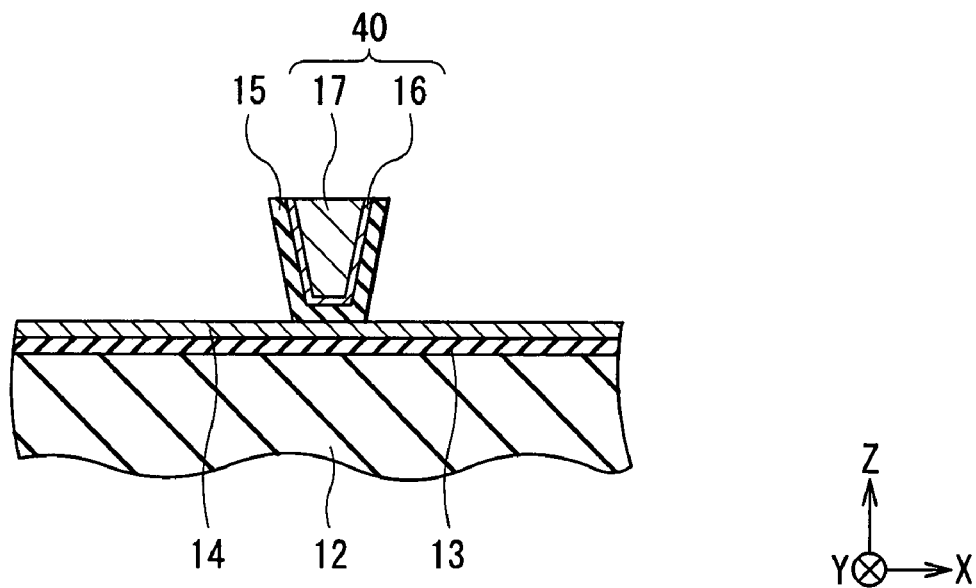
FIG. 11 is a cross section illustrating a process subsequent to FIG. 10.

By removing the remaining resist pattern 81 by using, for example, washing process with an organic solvent, ashing process, or the like, the leading shield 14 is exposed as shown in FIG. 11.

Figure 12:
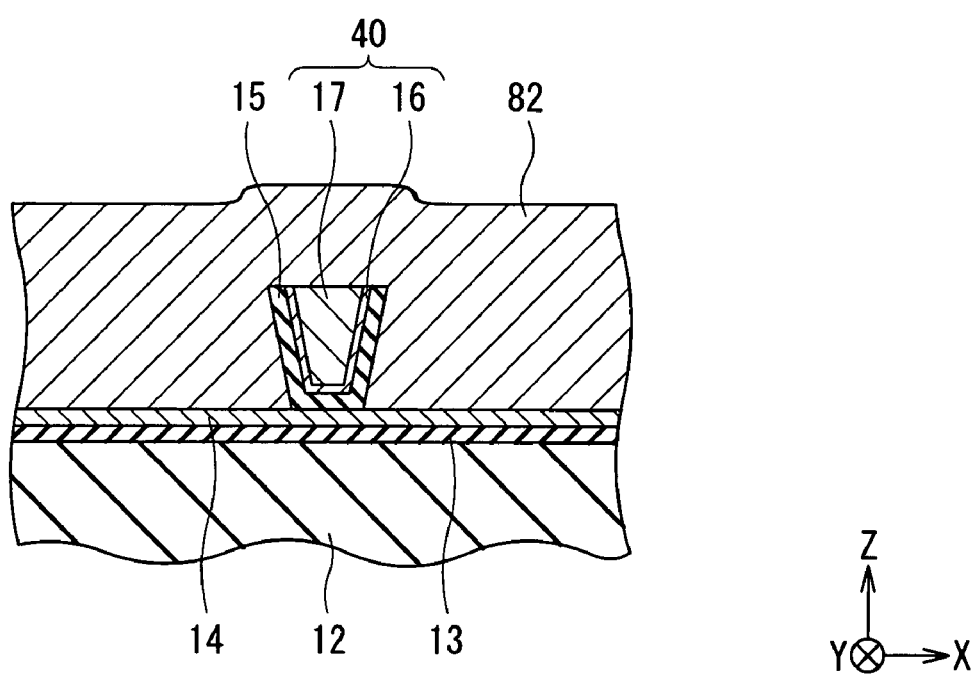
FIG. 12 is a cross section illustrating a process subsequent to FIG. 11.
Figure 13:
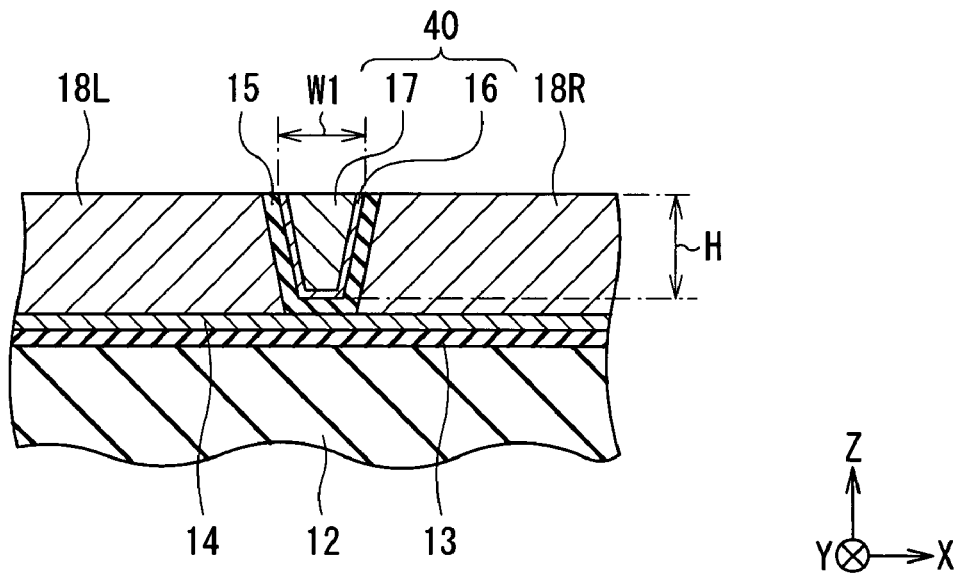
FIG. 13 is a cross section illustrating a process subsequent to FIG. 12.

Subsequently, as shown in FIGS. 12 and 13, the two side shields 18R and 18L are formed on both sides of the main magnetic pole layer 40 in the write track width direction so as to be apart from the main magnetic pole layer 40 with the nonmagnetic layer 15 in between.

At the time of forming the side shields 18R and 18L, for example, as shown in FIG. 12, by growing a plating film using the leading shield 14 as an electrode film, a plating layer 82 is formed as a second magnetic layer for forming the side shields 18R and 18L so as to cover at least the nonmagnetic layer 15 and the main magnetic pole layer 40. After that, by using the polishing or etching similar to that in the case of forming the main magnetic pole layer 40, the plating layer 82 is selectively removed until at least the nonmagnetic layer 15 and the main magnetic pole layer 40 are exposed. As shown in FIG. 13, on both sides of the main magnetic pole layer 40, the side shields 18R and 18L are formed on the leading shield 14. At the time of forming the side shields 18R and 18L, for example, a removal amount is adjusted so that each of the width W and the height H of the main magnetic pole layer 40 becomes a desired value.

Figure 14:
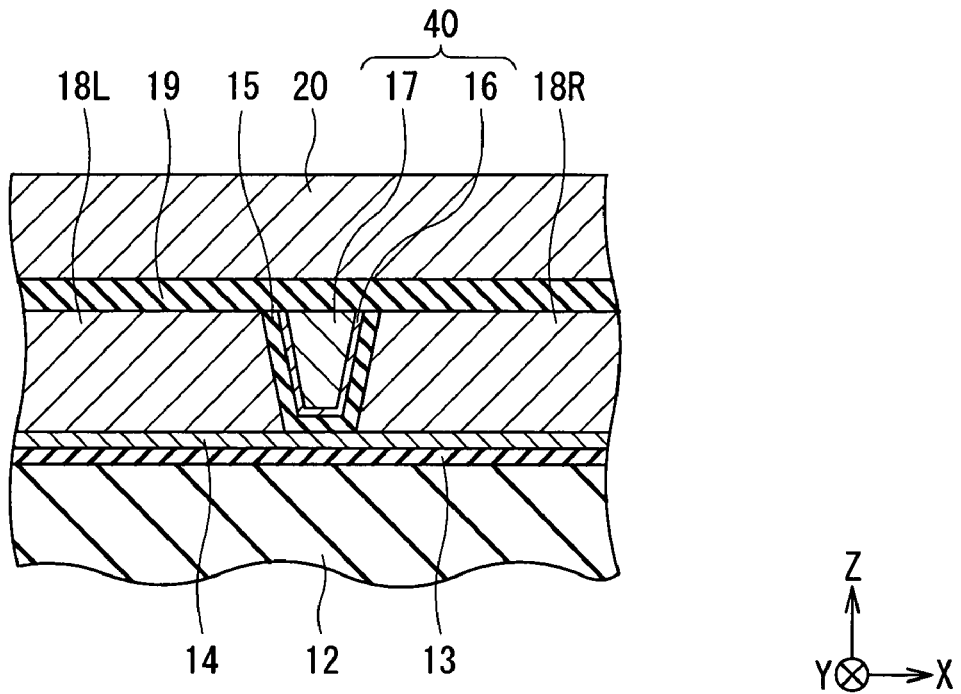
FIG. 14 is a cross section illustrating a process subsequent to FIG. 13.

Finally, as shown in FIG. 14, for example, by using sputtering, the gap layer 19 is formed as the second nonmagnetic layer on the nonmagnetic layer 15, the main magnetic pole layer 40, and the two side shields 18R and 18L. After that, for example, by using a forming method similar to that of the main magnetic pole layer 40, the trailing shield 20 is formed on the gap layer 19. In the trailing shield 20, the seed layer and the plating layer are not shown. As a result, the main part of the recording head part 100B completes.

In the thin film magnetic head of the embodiment and the method of manufacturing the same, the intervals SR and SL between the main magnetic pole layer 40 (the front end portion 40A) and the side shields 18R and 18L are constant irrespective of the positions, and the side shields 18R and 18L are coupled to the leading shield 14 and are apart from the trailing shield 20 with the gap layer 19 in between. For the following reason, information can be prevented from being unintentionally erased due to spread of the magnetic field for writing.

Figure 15:
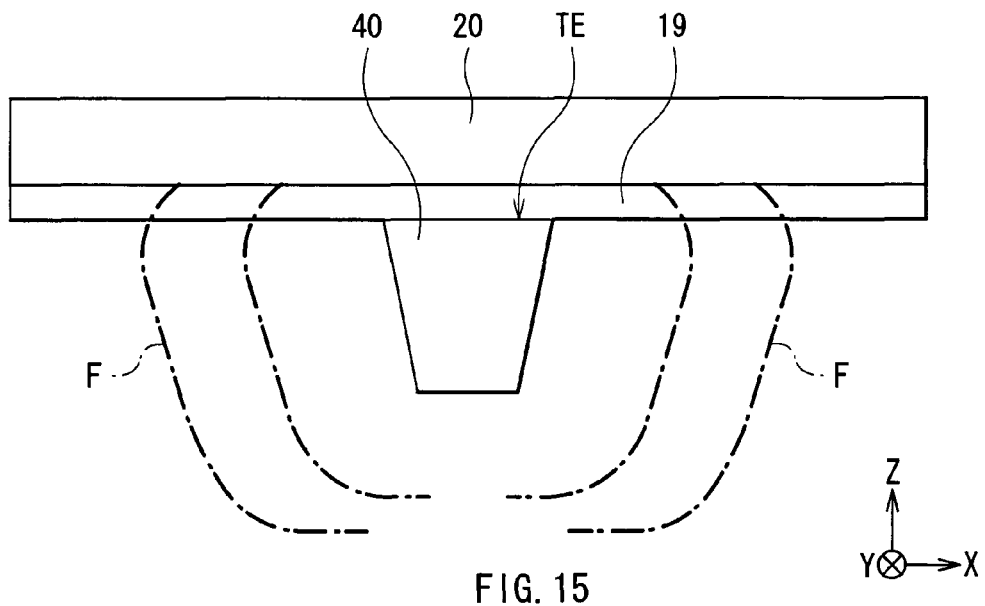
FIG. 15 is a cross section for explaining a problem in a thin film magnetic head as a first comparative example in contrast with the thin film magnetic head as the embodiment of the present invention.
Figure 16:
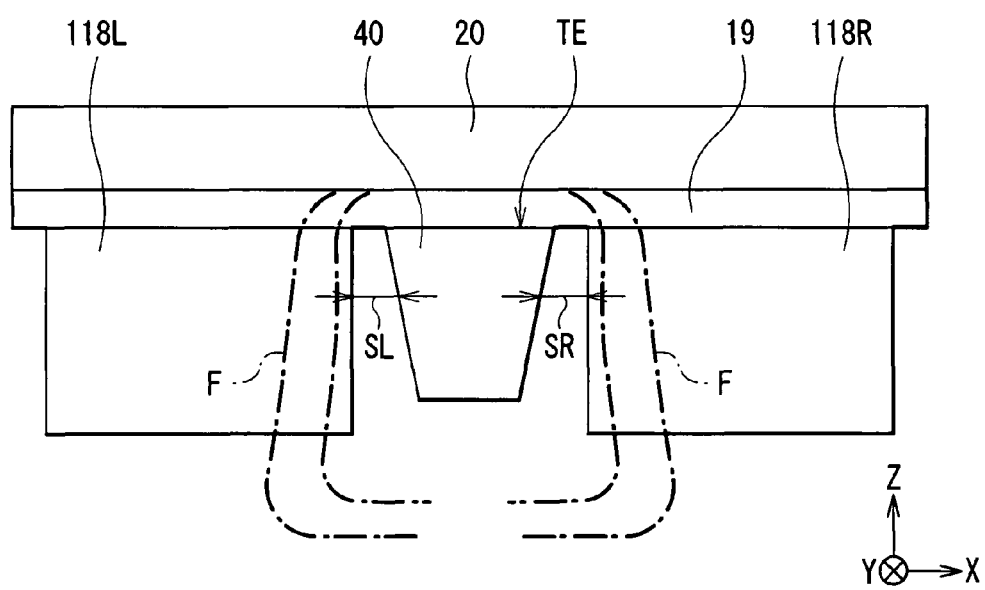
FIG. 16 is a cross section for explaining a problem in a thin film magnetic head as a second comparative example in contrast with the thin film magnetic head as the embodiment of the present invention.
Figure 17:
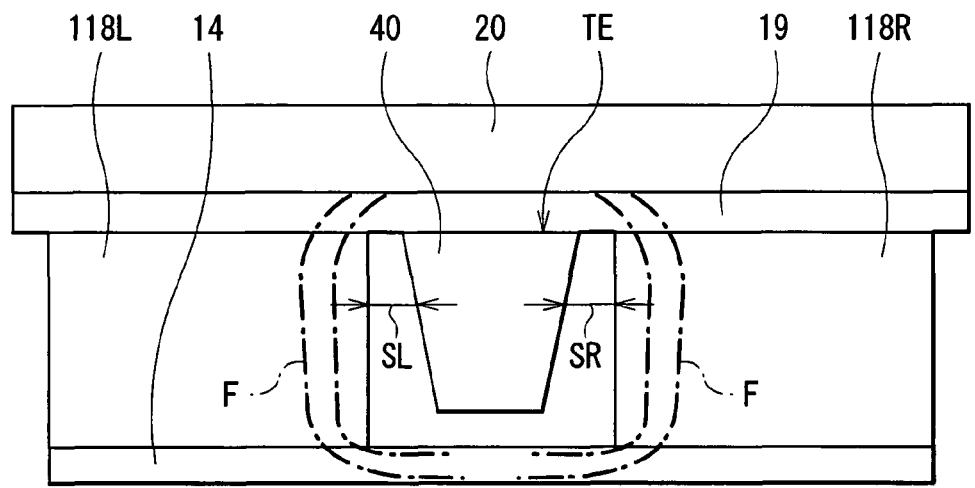
FIG. 17 is a cross section for explaining a problem in a thin film magnetic head as a third comparative example in contrast with the thin film magnetic head as the embodiment of the present invention.
Figure 18:
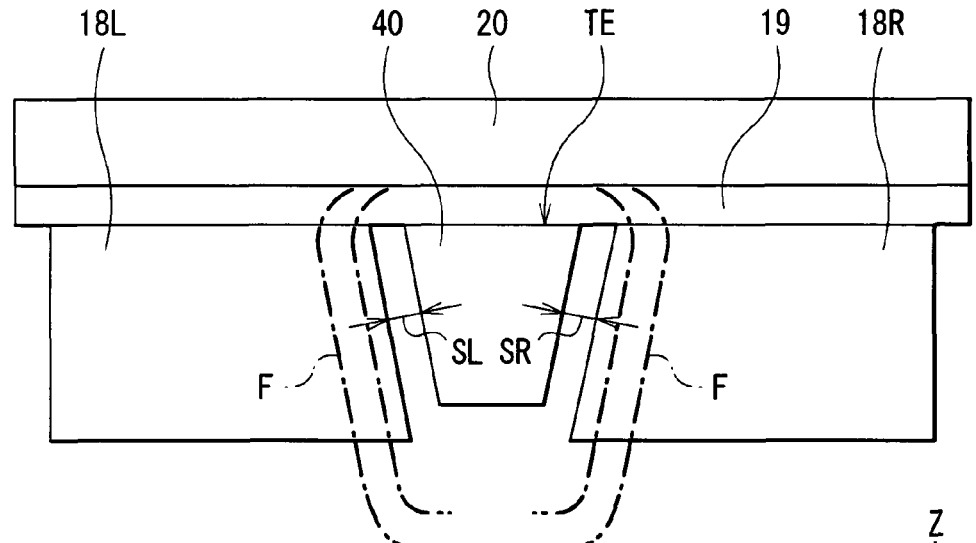
FIG. 18 is a cross section for explaining an advantage in the thin film magnetic head as the embodiment of the present invention.
Figure 19:
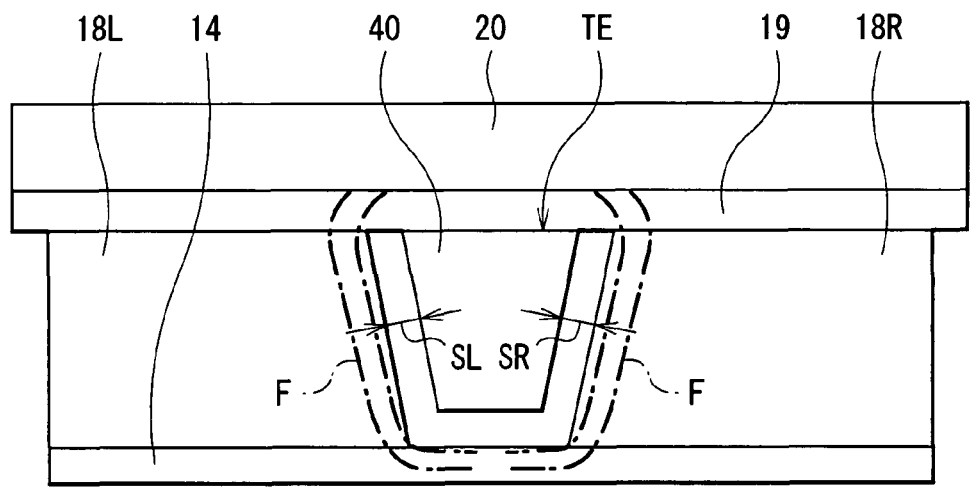
FIG. 19 is a cross section for explaining another advantage in the thin film magnetic head as the embodiment of the present invention.

To explain the relation between the existence/absence of shields for capturing magnetic fluxes and occurrence of unintended information erasure, FIGS. 15 to 17 show the configurations of thin film magnetic heads as comparative examples, and FIGS. 18 and 19 show the configuration of the thin film magnetic head of the embodiment. FIGS. 15 to 19 show the configuration corresponding to FIG. 3. The thin film magnetic head of the comparative example has a configuration similar to that of the thin film magnetic head of the embodiment except for the following point. Specifically, in the first comparative example shown in FIG. 15, the leading shield 14 and the side shields 18R and 18L are not provided, but only the trailing shield 20 is provided. In the second comparative example shown in FIG. 16, the leading shield 14 is not provided, but the trailing shield 20 and side shields 118R and 118L corresponding to the side shields 18R and 18L are provided. In the second comparative example, the intervals SR and SL vary according to the positions and gradually widen toward the leading side. In the third comparative example shown in FIG. 17, the side shields 118R and 118L are provided in addition to the leading shield 14 and the trailing shield 20. On the other hand, in the case of FIG. 18, the thin film magnetic head of the embodiment does not have the leading shield 14 but has only the side shields 18R and 18L and the trailing shield 20. In the case shown in FIG. 19, the leading shield 14, the side shields 18R and 18L, and the trailing shield 20 are provided.

To prevent unintended erasure of information by capturing spread components of the magnetic flux by using the shields when the magnetic flux is emitted from the front end portion 40A, it is important to narrow the spread range of the magnetic field for writing to a narrow range near the front end portion 40A as much as possible.

In the first comparative example, as shown in FIG. 15, the trailing shield 20 captures the spread components of the magnetic flux, so that the gradient of the magnetic field F for recording increases near the trailing edge TE. However, since no shields are disposed on the leading side of the front end portion 40A and on both sides in the write track width direction (hereinbelow, simply called "both sides"), the magnetic field F spreads conspicuously on the leading side and on both sides of the front end portion 40A. In this case, when a specific track (a track to which information is to be normally recorded) on the recording medium 70 is magnetized with the magnetic field F, tracks adjacent to the track to be recorded tend to be also magnetized. Consequently, information already recorded on the adjacent tracks tends to be unintentionally erased.

In the second comparative example, as shown in FIG. 16, the side shields 118R and 118L capture spread components of the magnetic flux. Therefore, as compared with the first comparative example (refer to FIG. 15), spread of the magnetic fields F on both sides of the front end portion 40A is suppressed. However, the intervals SR and SL vary according to positions, and the side shields 118R and 118L do not excellently capture the spread components of the magnetic flux. Therefore, spread of the magnetic fields F on both sides of the front end portion 40A is not sufficiently suppressed. In the case where skew occurs, information recorded on the adjacent tracks is easily erased. The skew is a phenomenon that the front end portion 40A tilts with respect to the tangential direction of the track to be recorded provided like a curved line in the recording medium 70. Moreover, since no shield is disposed on the leading side of the front end portion 40A, spread of the magnetic fields F on the leading side of the front end portion 40A is about the same as that of the first comparative example.

In the third comparative example, as shown in FIG. 17, the leading shield 14 and the side shields 118R and 118L capture the spread components of the magnetic flux. Consequently, as compared with the second comparative example (refer to FIG. 16), the spread of the magnetic fields F is suppressed on the leading side and both sides of the front end portion 40A. However, as described in the second comparative example, the intervals SR and SL vary according to the positions, so that spread of the magnetic fields F cannot be sufficiently suppressed on both sides of the front end portion 40A. Therefore, like the second comparative example, when skew occurs, information in adjacent tracks tends to be erased.

In contrast, in the embodiment, as shown in FIG. 18, the intervals SR and SL are constant in all of the positions, so that the side shields 18R and 18L easily capture the spread components of the magnetic flux. As compared with the second comparative example, spread of the magnetic field F is sufficiently suppressed on both sides of the front end portion 40A. In this case, as shown in FIG. 19, when the leading shield 14 is disposed on the leading side of the front end portion 40A, spread of the magnetic fields F is suppressed more on the leading side of the front end portion 40A. The spread range is narrowed to a narrower range around the front end portion 40A as compared with the first to third comparative examples. Consequently, even when skew occurs, erasure of information in the adjacent tracks is suppressed. Therefore, in the embodiment, unintended erasure of information due to spread of the magnetic field for writing can be prevented.

In this case, by using the ALD for forming the nonmagnetic layer 15, the intervals SR and SL can be made constant more strictly as compared with the case of using a method other than the ALD (for example, sputtering, CVD (Chemical Vapor Deposition), or the like), or the like. In the case of using a method other than the ALD, when the nonmagnetic layer 15 is formed so as to cover the inner wall 81W in the resist pattern 81 as shown in FIG. 7, the thickness of the nonmagnetic layer 15 changes along the inner wall 81W according to the depth of the opening 81K or the tilt angle ω. Consequently, there is the possibility that the tilt angle Φ is deviated from the tilt angle ω. In this case, as shown in FIG. 10, when the main magnetic pole layer 40 is formed, the bevel angle θ is deviated from the tilt angle ω, so that the trailing edge width W1 and the bevel angle θ are deviated from target values. On the other hand, in the case of using the ALD, the thickness of the nonmagnetic layer 15 becomes uniform along the inner wall 81W, so that the tilt angle Φ becomes equal to the tilt angle ω. In this case, the bevel angle θ becomes equal to the tilt angle ω, so that the trailing edge width W1 and the bevel angle θ coincide with target values. Therefore, the intervals SR and SL can be made strictly constant. In particular, by setting the film forming temperature of the ALD to be lower than the glass transition temperature of the resist pattern 81, deformation of the resist pattern 81 is suppressed in the process of forming the nonmagnetic layer 15. Consequently, deformation of the shape of the resist pattern 81 due to an expansion phenomenon or change in the tilt angle ω from the initial value due to a fluidization phenomenon can be prevented.

In the embodiment, in the case of disposing the leading shield 14, the two side shields 18R and 18L, and the trailing shield 20 around the main magnetic pole layer 40 (front end portion 40A), the side shields 18R and 18L are coupled to the leading shield 14 but are not coupled to the trailing shield 20. Therefore, the intensity of the magnetic field for writing can be assured for the following reason.

Figure 20:
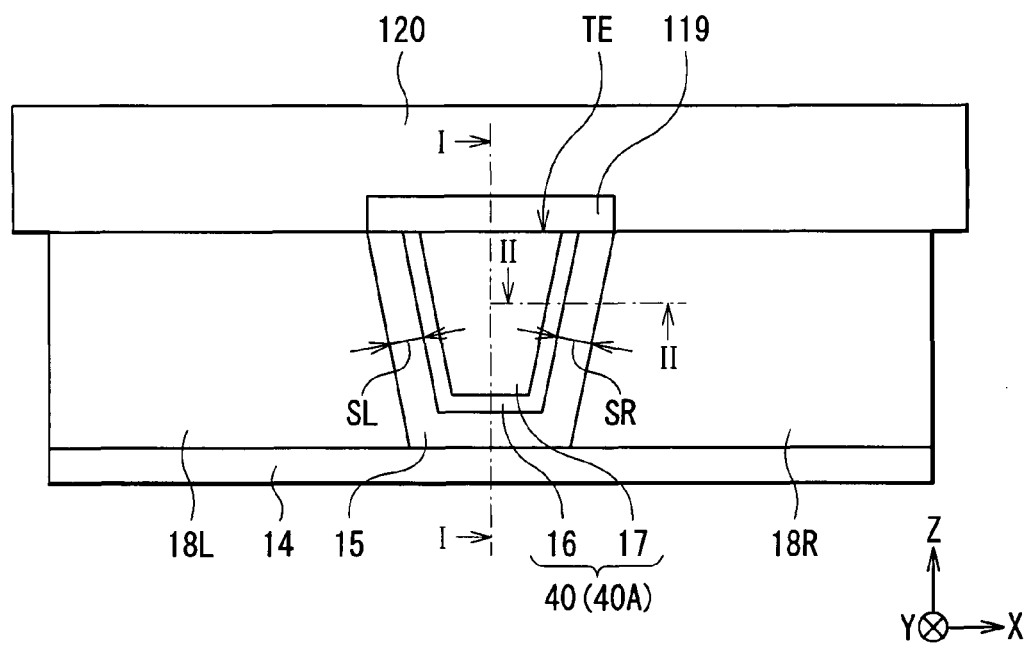
FIG. 20 is a cross section for explaining a problem in a thin film magnetic head as a fourth comparative example in contrast with the thin film magnetic head as the embodiment of the present invention.

FIG. 20 shows the configuration of a thin film magnetic head of a fourth comparative example for explaining the relation between a coupling state of the shields for capturing the magnetic flux and an occurrence state of unintended erasure of information. The configuration corresponds to FIG. 3. The thin film magnetic head of the fourth comparative example has a configuration similar to that of the thin film magnetic head of the embodiment except for the point that a gap layer 119 and a trailing shield 120 corresponding to the gap layer 19 and the trailing shield 20, respectively, are provided. The trailing shield 120 is coupled to the two side shields 18R and 18L as the gap layer 119 is narrowed so that the trailing shield 120 is apart from the main magnetic pole layer 40.

In the fourth comparative example, as shown in FIG. 20, the side shields 18R and 18L are coupled to the trailing shield 120 (in a magnetic conduction state). Although the trailing shield 120 is provided, the gradient of the magnetic field for writing does not sufficiently increase around the trailing edge TE. Thus, the intensity of the magnetic field around the trailing edge TE does not increase so much. In this case, although the intensity of an unnecessary magnetic field exerting the influence on adjacent tracks decreases, the intensity of the magnetic field for writing also decreases.

In contrast, in the embodiment, as shown in FIG. 3, the side shields 18R and 18L are not coupled to the trailing shield 20 (not in a magnetic conduction state). The trailing shield 20 is apart from the side shields 18R and 18L with the gap layer 19 in between. Consequently, the gradient of the magnetic field for writing increases sufficiently around the trailing edge TE, so that the intensity of the magnetic field increases sufficiently. Therefore, in the embodiment, the intensity of the magnetic field for writing can be assured.

In the embodiment, the leading shield 14 and the two side shields 18R and 18L are apart (magnetically separated) from the main magnetic pole layer 40 (the front end portion 40A). The trailing shield 20 is apart (magnetically separated) from the main magnetic pole layer 40 in a front portion and is (magnetically) coupled to the main magnetic pole layer 40 in a rear portion. Consequently, the intensity of the magnetic field is sufficiently strong around the trailing side in the main magnetic pole layer 40 and is sufficiently low around the leading side. Therefore, the recording process can be stably executed.

In the embodiment, as shown in FIGS. 11 to 13, the two side shields 18R and 18L are formed by growing a plating film using the leading shield 14 as an electrode film. As compared with the case of forming the side shields 18R and 18L without using the leading shield 14 as an electrode film, the process of forming the leading shield 14 and the side shields 18R and 18L is simpler. Specifically, in the case of forming the leading shield 14, it is unnecessary to form a thick film by using a wet film forming method such as complicated plating, but it is sufficient to form a thin film by using a dry film forming method such as simple sputtering. In addition, in the case of forming the side shields 18R and 18L, it is unnecessary to newly form a seed layer for growing the plating film. Therefore, in the embodiment, the thin film magnetic head can be easily manufactured.

Figure 21:
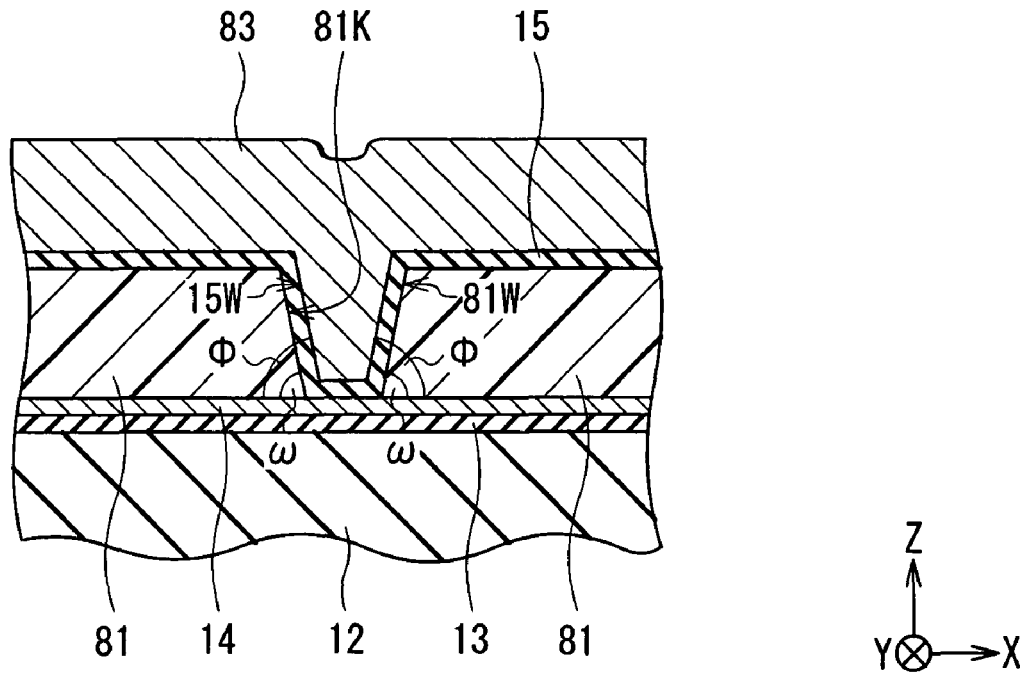
FIG. 21 is a cross section illustrating a process of manufacturing a thin film magnetic head in the case where a nonmagnetic layer is formed by using a method other than the ALD method.
Figure 22:
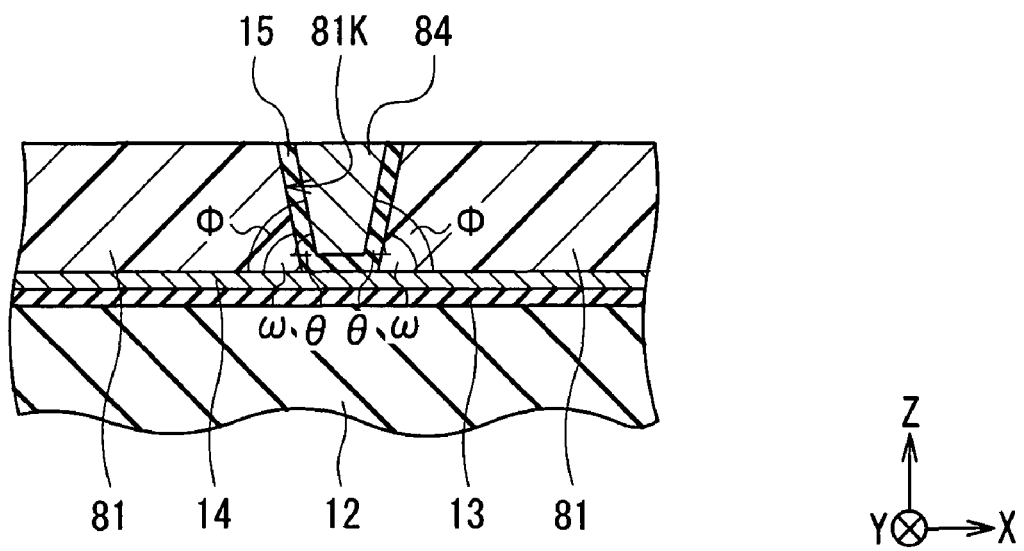
FIG. 22 is a cross section illustrating a process subsequent to FIG. 21.

In the embodiment, as shown in FIGS. 8 to 10, the main magnetic pole layer 40 is formed so as to include the shield layer 16 and the plating layer 17. However, the invention is not always limited to the configuration. For example, as shown in FIGS. 21 and 22 corresponding to FIGS. 8 to 10, a magnetic layer 83 is formed on the nonmagnetic layer 15 in place of the seed layer 16 and the plating layer 17 by using sputtering or CVD. After that, the nonmagnetic layer 15 and the magnetic layer 83 are selectively removed until the resist pattern 81 is exposed. In such a manner, a main magnetic pole layer 84 may be formed instead of the main magnetic pole layer 40. In this case as well, similar effects can be obtained.

Figure 23:
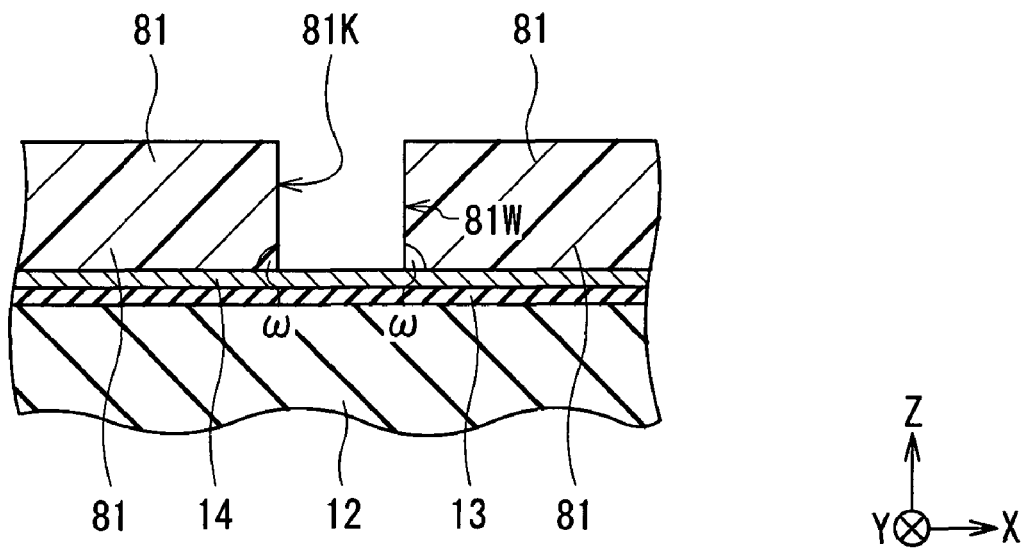
FIG. 23 is a cross section illustrating a process in a modification of the method of manufacturing the thin film magnetic head as the embodiment of the invention.
Figure 24:
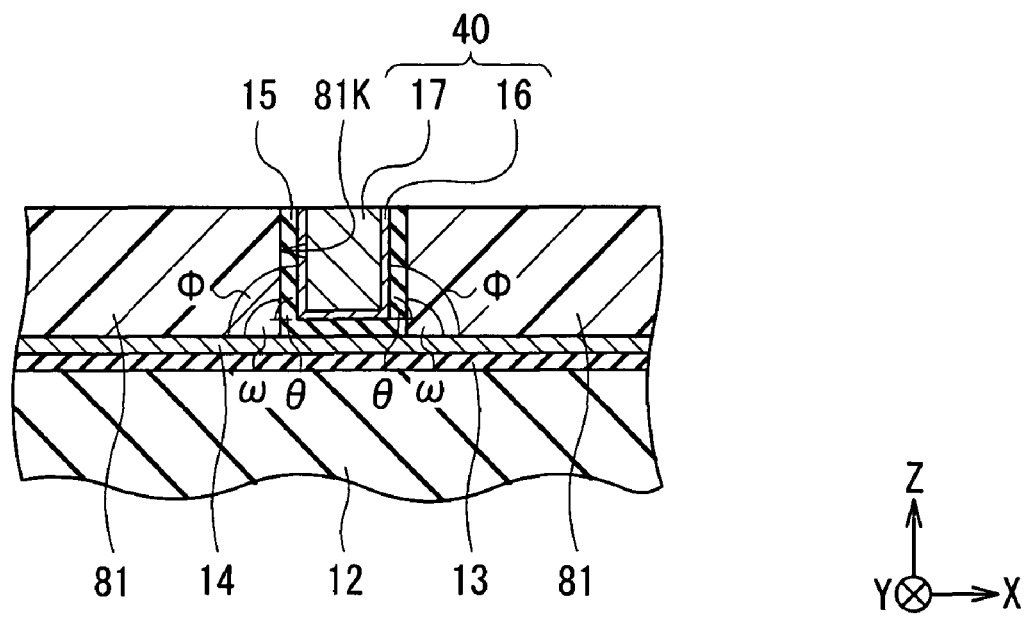
FIG. 24 is a cross section illustrating a process subsequent to FIG. 23.

In the embodiment, as shown in FIG. 6, by forming the resist pattern 81 so that the inner wall 81W is inclined with respect to the surface of the leading shield 14 (the tilt angle ω<90°), the main magnetic pole layer 40 is formed to have the inverted trapezoidal shape in cross section as shown in FIG. 10. The invention, however, is not limited to the embodiment. For example, as shown in FIG. 23 corresponding to FIG. 6, by forming the resist pattern 81 so that the inner wall 81W is orthogonal to the surface of the leading shield 14 (the tilt angle ω=90°), the main magnetic pole layer 40 may be formed so as to have a rectangular shape in cross section as shown in FIG. 24 corresponding to FIG. 10. In this case as well, similar effects can be obtained.

Figure 25:
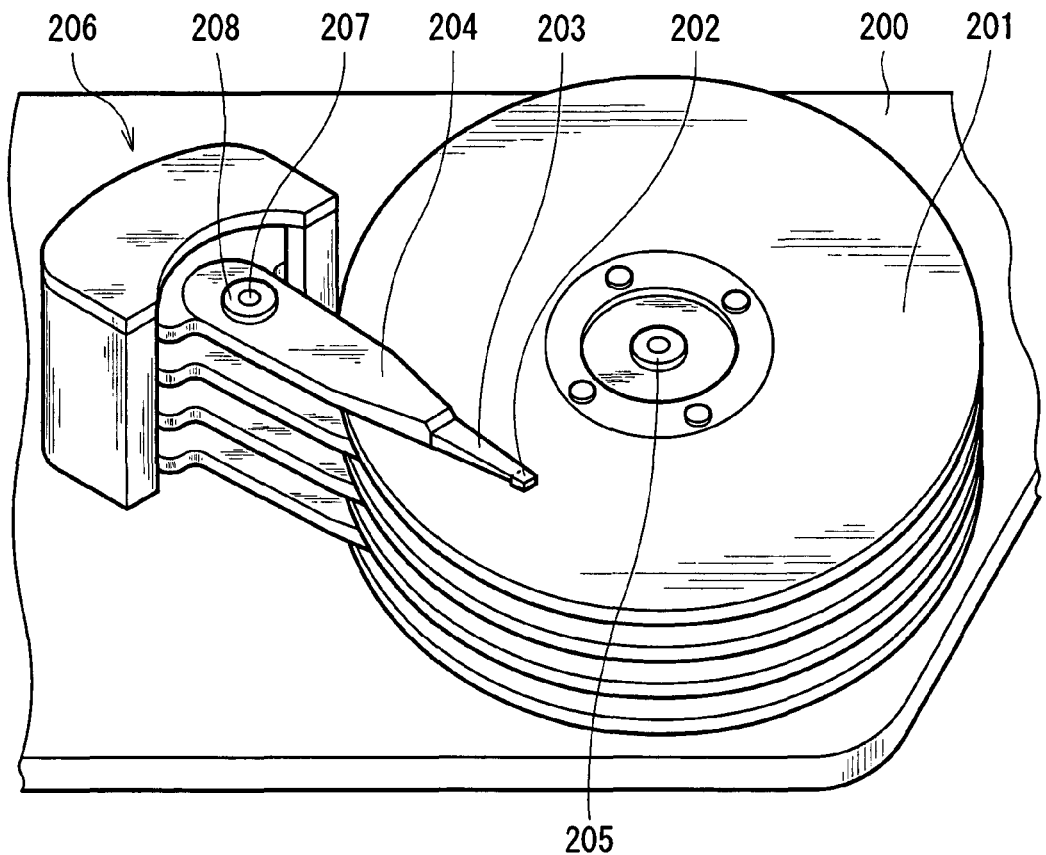
FIG. 25 is a perspective view of a magnetic recording apparatus on which the thin film magnetic head as the embodiment of the invention is mounted.
Figure 26:
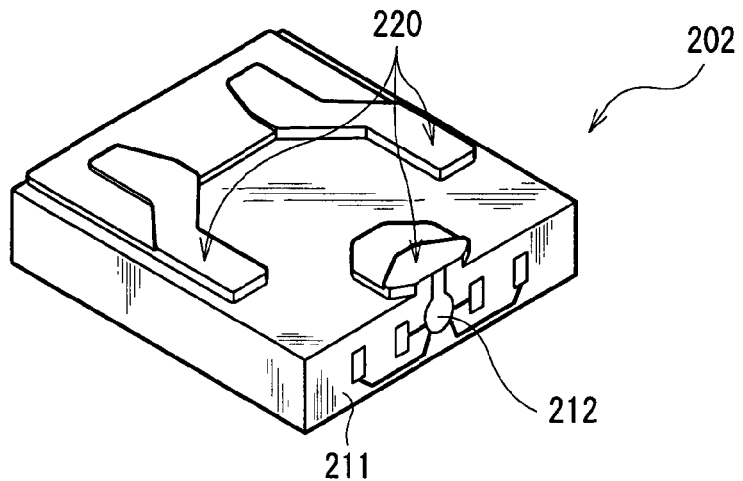
FIG. 26 is an enlarged perspective view of the main part of the magnetic recording apparatus shown in FIG. 25.

Next, the configuration of a magnetic recording apparatus on which the perpendicular magnetic write head of the invention is mounted will be described. FIG. 25 is a perspective view showing the configuration of the magnetic recording apparatus. FIG. 26 is an enlarged perspective view of the main part of the magnetic recording apparatus. The magnetic recording apparatus includes the above-mentioned thin film magnetic head and is, for example, a hard disk drive.

As shown in FIG. 25, the magnetic recording apparatus has, for example, in a casing 200, a plurality of magnetic disks (such as hard disks) 201 corresponding to the recording medium 70 (refer to FIG. 5), a plurality of suspensions 203 disposed in correspondence with the magnetic disks 201 and each supporting a magnetic head slider 202 at one end, and a plurality of arms 204 supporting the other ends of the suspensions 203. The magnetic disk 201 can rotate around a spindle motor 205 fixed to the casing 200 as a center. The arms 204 are connected to a driving unit 206 as a power source and can swing around a fixed shaft 207 fixed to the casing 200 as a center via a bearing 208. The driving unit 206 includes, for example, a drive source such as a voice coil motor. The magnetic recording apparatus is, for example, a model in which the plurality of arms 204 can integrally swing around the fixed shaft 207 as a center. FIG. 25 shows the casing 200 which is partially cut away so that the inner structure of the magnetic recording apparatus can be seen.

As shown in FIG. 26, the magnetic head slider 202 has a configuration that a thin film magnetic head 212 executing both of recording process and reproducing process is attached to one of faces of a base 211 having an almost rectangular parallelepiped structure made of a nonmagnetic insulating material such as AlTic. The base 211 has one face (air bearing surface 220) having projections and depressions for decreasing air resistance which occurs when the arm 204 swings. The thin film magnetic head 212 is attached to another face (the face on the right front side in FIG. 26) orthogonal to the air bearing surface 220. The thin film magnetic head 212 has the configuration described in the foregoing embodiment. When the magnetic disk 201 rotates at the time of recording/reproducing information, the magnetic head slider 202 floats from the recording surface of the magnetic disk 201 by using the air current generated between the recording surface of the magnetic disk 201 (the surface facing the magnetic head slider 202) and the air bearing surface 220. FIG. 26 shows a state where the magnetic head slider 202 in FIG. 25 is upside down so that the structure on the air bearing surface 220 side of the magnetic head slider 202 can be seen well.

In the magnetic recording apparatus, when the arm 204 swings at the time of recording/reproducing information, the magnetic head slider 202 moves to a predetermined area (recording area) in the magnetic disk 201. When current is passed to the thin film magnetic head 212 in a state where it faces the magnetic disk 201, the thin film magnetic head 212 operates on the basis of the operation principle to perform the recording or reproducing process on the magnetic disk 201.

Since the thin film magnetic head is mounted on the magnetic recording apparatus, unintended erasure of information caused by spread of the magnetic fields for recording can be prevented.

EXAMPLES

Examples of the present invention will now be described.

Figure 27:
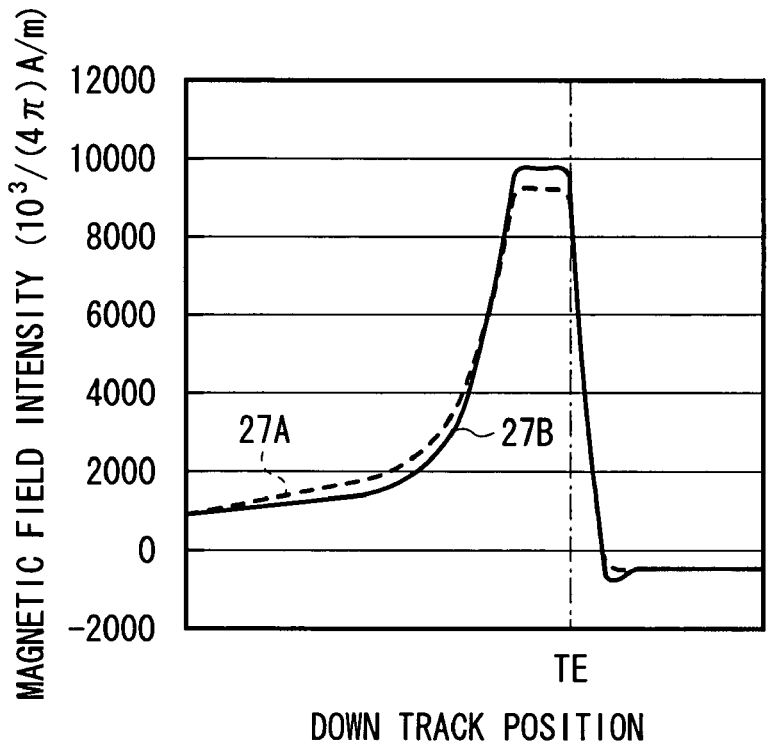
FIG. 27 is a diagram showing a magnetic field intensity distribution around a main magnetic pole layer in a down track direction.
Figure 28:
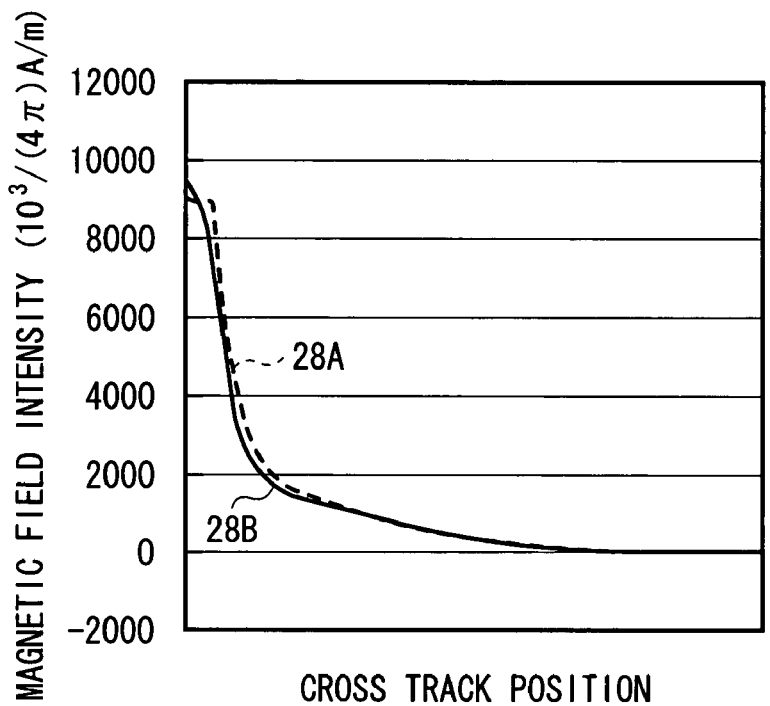
FIG. 28 is a diagram showing a magnetic field intensity distribution around the main magnetic pole layer in a cross track direction.

Occurrence of unintended erasure of information in the perpendicular magnetic write head was examined and results shown in FIGS. 27 and 28 were obtained. FIGS. 27 and 28 show intensity distributions of magnetic fields for recording around the main magnetic pole layer 40 (the front end portion 40A). The vertical axis shows the magnetic field intensity ($\times 10^3/(4\pi)$A/m=Oe), and the horizontal axis indicates down track position (FIG. 27) or cross track position (FIG. 28). "27A" and "28A" shown in FIGS. 27 and 28 show results of the fourth comparative example (see FIG. 20) in which the two side shields 18R and 18L are coupled to the trailing shield 120. "27B" and "28B" show results of the present invention (see FIG. 3) in which the two side shields 18R and 18L are apart from the trailing shield 20 with the gap layer 19 in between. Referring to FIGS. 3 and 20, the "down track position" is a position on the I-I line, and the "cross track position" is a position on the II-II line. "TE" shown in FIG. 27 expresses the position of the trailing edge TE.

At the time of examining the intensity distribution of the magnetic field, the materials and thicknesses of the components were set as follows. The material and the thickness of the leading shield 14 were set as a cobalt iron nickel alloy and 0.2 μm, respectively. Those of the nonmagnetic layer 15 were set as alumina and 0.05 μm, respectively. Those of the main magnetic pole layer 40 were set as a cobalt iron nickel alloy and 0.3 μm. Those of the side shields 18R and 18L were set as permalloy and 0.3 μm, respectively. Those of the gap layer 19 were set as alumina and 0.04 μm, respectively. Those of the trailing shield 20 were set as a cobalt iron nickel alloy and 1.0 μm, respectively. As the methods of forming the components, sputtering was used for the leading shield 14, the ALD was used for the nonmagnetic layer 15, and plating was used for the main magnetic pole layer 40, the side shields 18R and 18L, and the trailing shield 20.

As understood from the results shown in FIG. 27, in both of the fourth comparative example and the present invention, the magnetic field intensity in the down track position gently increases toward the trailing edge TE and, after that, sharply decreases. The result shows that since the trailing shields 20 and 120 are disposed on the trailing side of the front end portion 40A, spread of the magnetic fields for recording is suppressed in the down track direction, so that the gradient of the magnetic field increases. However, when the fourth comparative example and the present invention are compared with each other, the magnetic field intensity at the trailing edge TE in the present invention increases more than that in the fourth comparative example.

As understood from the results shown in FIG. 28, in both of the fourth comparative example and the present invention, the magnetic field intensity in the cross track position is the maximum in the center position of the front end portion 40A and sharply decreases with distance from the center position. The result shows that since the side shields 18R and 18L are disposed on both sides in the write track width direction of the front end portion 40A, spread of the magnetic fields for recording is suppressed in the write track width direction, so that the gradient of the magnetic field increases.

From the above, the following was confirmed. In the perpendicular magnetic write head of the present invention, in the case of disposing the leading shield 14, the two side shields 18R and 18L, and the trailing shield 20 around the front end portion 40A, the side shields 18R and 18L are coupled to the leading shield 14 but are apart from the trailing shield 20. With the configuration, while assuring the intensity of the magnetic fields for recording, information can be prevented from being unintentionally erased due to the spread of the magnetic fields.

Although the present invention has been described by the embodiments and examples, the invention is not limited to the foregoing embodiments and examples but can be variously modified. Concretely, in the foregoing embodiments and examples, the perpendicular magnetic write head of the present invention is applied to a composite head. The invention is not always limited to the above but the perpendicular magnetic write head may be applied to a recording-only head having no reproduction head part. In this case as well, similar effects can be obtained.

The perpendicular magnetic write head, the method of manufacturing the same, and the magnetic recording apparatus of the invention can be applied to, for example, a hard disk drive for magnetically recording information on a hard disk.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic write head comprising:
   a magnetic pole generating a magnetic field for writing;
   a nonmagnetic layer surrounding all sides of the magnetic pole, except one side, a thickness of the nonmagnetic layer being constant in any position of the nonmagnetic layer;
   a gap layer disposed on the one side of the magnetic pole;
   a couple of side shields disposed on the gap layer and sides of the nonmagnetic layer in a write track width direction;
   a leading shield disposed on the side shields and the nonmagnetic layer such that the side shields and the nonmagnetic layer are sandwiched between the gap layer and the leading shield; and
   a trailing shield disposed on the gap layer such that the gap layer, the side shields, and the nonmagnetic layer are sandwiched between the trailing shield and the leading shield, the side shields and the trailing shield being completely separated by the gap layer, such that the side shields and the trailing shield are not connected with each other.

2. The perpendicular magnetic write head according to claim 1, wherein a nonmagnetic layer having uniform thickness and formed by ALD (Atomic Layer Deposition) is provided at least between the magnetic pole and each of the side shields.

3. The perpendicular magnetic write head according to claim 1, wherein an end face of the magnetic pole on an air bearing surface has an inverted trapezoidal shape.

4. The perpendicular magnetic write head according to claim 1, wherein a rear portion of the trailing shield is coupled to the magnetic pole with a magnetic member for coupling in between.

5. A magnetic recording apparatus comprising:
   a recording medium; and
   a perpendicular magnetic write head according to claim 1.

6. The magnetic recording apparatus according to claim 5, wherein the recording medium includes a magnetization layer disposed on the side close to the perpendicular magnetic write head and a soft magnetic layer disposed on the side far from the perpendicular magnetic write head.

7. A perpendicular magnetic write head comprising:
   a magnetic pole generating a magnetic field for writing;
   a nonmagnetic layer surrounding all sides of the magnetic pole, except one side;
   a gap layer disposed on the one side of the magnetic pole;
   a couple of side shields disposed on the gap layer and sides of the nonmagnetic layer in a write track width direction;
   a leading shield disposed on the side shields and the nonmagnetic layer such that the side shields and the nonmagnetic layer are sandwiched between the gap layer and the leading shield; and
   a trailing shield disposed on the gap layer such that the gap layer, the side shields, and the nonmagnetic layer are sandwiched between the trailing shield and the leading shield, the side shields and the trailing shield being completely separated by the gap layer, such that the side shields and the trailing shield are not connected with each other.

8. The perpendicular magnetic write head according to claim 7, wherein the leading shield is an electrode film, and
   the side shields are formed by selectively growing a plating film on the leading shield as a seed electrode film.

9. A magnetic recording apparatus comprising:
   a recording medium; and
   a perpendicular magnetic write head according to claim 7.

10. The magnetic recording apparatus according to claim 9, wherein the recording medium includes a magnetization layer disposed on the side close to the perpendicular magnetic write head and a soft magnetic layer disposed on the side far from the perpendicular magnetic write head.

* * * * *